(12) United States Patent
Amling et al.

(10) Patent No.: US 8,744,977 B2
(45) Date of Patent: Jun. 3, 2014

(54) SYSTEMS AND METHODS FOR VIRTUAL INVENTORY MANAGEMENT

(75) Inventors: Alan Amling, Marietta, GA (US); George R. Post, Alpharetta, GA (US); David S. Zamsky, Marietta, GA (US); Kenneth T. Rankin, Alpharetta, GA (US); Stuart D. Marcus, Atlanta, GA (US); Bruce L. Woods, Mesa, AZ (US)

(73) Assignee: United Parcel Service of America, Inc., Atlanta, GA (US)

( * ) Notice: Subject to any disclaimer, the term of this patent is extended or adjusted under 35 U.S.C. 154(b) by 829 days.

(21) Appl. No.: 12/943,649

(22) Filed: Nov. 10, 2010

(65) Prior Publication Data

US 2011/0055102 A1    Mar. 3, 2011

Related U.S. Application Data

(62) Division of application No. 11/026,500, filed on Dec. 30, 2004, now Pat. No. 7,853,536.

(60) Provisional application No. 60/533,300, filed on Dec. 30, 2003.

(51) Int. Cl.
*G06Q 30/00*    (2012.01)

(52) U.S. Cl.
USPC ............. 705/331; 705/28; 705/338; 235/375; 340/572.1; 370/389

(58) Field of Classification Search
USPC ............ 705/28, 29, 300, 333, 75, 1; 709/224, 709/219, 328
See application file for complete search history.

(56) References Cited

U.S. PATENT DOCUMENTS

| | | | |
|---|---|---|---|
| 3,353,845 | A | 11/1967 | Curran |
| 4,167,476 | A | 9/1979 | Jackson |
| 4,799,156 | A | 1/1989 | Shavit et al. |
| 4,832,204 | A | 5/1989 | Handy |
| 4,837,701 | A | 6/1989 | Sansone |

(Continued)

FOREIGN PATENT DOCUMENTS

| | | |
|---|---|---|
| CA | 2424649 A1 | 9/2004 |
| EP | 0 424 728 A2 | 5/1991 |

(Continued)

OTHER PUBLICATIONS

Office Action dated Jun. 30, 2011, of related U.S. Appl. No. 12/816,919, filed Jun. 16, 2010.

(Continued)

*Primary Examiner* — Vanel Frenel
(74) *Attorney, Agent, or Firm* — Alston & Bird LLP

(57) ABSTRACT

Disclosed is an integrated global shipment system that provides end-to-end visibility of the movement of a package. The integrated global shipment system employs a shipment consolidating application for integrating one or more freight tracking systems with one or more end-delivery systems. As a result, shippers are provided with complete visibility of the movement of their shipments of goods from an origin country to a destination country and till the final consignees. In addition, the integrated shipment system significantly decreases the cost of managing inventories by providing a virtual inventory solution. Under this virtual inventory solution, suppliers are able to bypass distribution centers and delay allocation of goods until after the importation of goods into a destination country.

3 Claims, 26 Drawing Sheets

(56) References Cited

U.S. PATENT DOCUMENTS

| | | |
|---|---|---|
| 5,008,827 A | 4/1991 | Sansone et al. |
| 5,051,914 A | 9/1991 | Sansone et al. |
| 5,063,506 A | 11/1991 | Brockwell |
| 5,068,797 A | 11/1991 | Sansone et al. |
| 5,161,109 A | 11/1992 | Keating et al. |
| 5,311,424 A | 5/1994 | Mukherjee et al. |
| 5,315,508 A | 5/1994 | Bain et al. |
| 5,375,240 A | 12/1994 | Grundy |
| 5,485,369 A | 1/1996 | Nicholls |
| 5,557,518 A | 9/1996 | Rosen |
| 5,631,827 A | 5/1997 | Nicholls et al. |
| 5,671,280 A | 9/1997 | Rosen |
| 5,694,551 A | 12/1997 | Doyle et al. |
| 5,712,789 A | 1/1998 | Radican |
| 5,717,989 A | 2/1998 | Tozzoli et al. |
| 5,721,832 A | 2/1998 | Westrope et al. |
| 5,724,424 A | 3/1998 | Gifford |
| 5,732,400 A | 3/1998 | Mandler et al. |
| 5,770,841 A | 6/1998 | Moed et al. |
| 5,787,402 A | 7/1998 | Potter et al. |
| 5,794,207 A | 8/1998 | Walker et al. |
| 5,802,497 A | 9/1998 | Manasse |
| 5,890,137 A | 3/1999 | Koreeda |
| 5,895,454 A | 4/1999 | Harrington |
| 5,897,621 A | 4/1999 | Boesch |
| 5,909,492 A | 6/1999 | Payne et al. |
| 5,910,896 A | 6/1999 | Hahn-Carlson |
| 5,949,876 A | 9/1999 | Ginter et al. |
| 5,950,178 A | 9/1999 | Borgato |
| 5,960,408 A | 9/1999 | Martin et al. |
| 5,963,923 A | 10/1999 | Garber |
| 5,968,110 A | 10/1999 | Westrope et al. |
| 5,970,475 A | 10/1999 | Barnes et al. |
| 5,974,146 A | 10/1999 | Randle et al. |
| 5,995,950 A | 11/1999 | Barns-Slavin et al. |
| 6,006,199 A | 12/1999 | Berlin et al. |
| 6,029,150 A | 2/2000 | Kravitz |
| 6,041,315 A | 3/2000 | Pollin |
| 6,047,264 A | 4/2000 | Fisher et al. |
| 6,049,785 A | 4/2000 | Gifford |
| 6,058,373 A | 5/2000 | Blinn et al. |
| 6,064,994 A | 5/2000 | Kubatzki et al. |
| 6,067,532 A | 5/2000 | Gebb |
| 6,081,790 A | 6/2000 | Rosen |
| 6,108,639 A | 8/2000 | Walker et al. |
| 6,141,653 A | 10/2000 | Conklin et al. |
| 6,151,588 A | 11/2000 | Tozzoli et al. |
| 6,167,385 A | 12/2000 | Hartley-Urquhart |
| 6,175,921 B1 | 1/2001 | Rosen |
| 6,178,409 B1 | 1/2001 | Weber et al. |
| 6,186,893 B1 | 2/2001 | Walker et al. |
| 6,199,051 B1 | 3/2001 | Gifford |
| 6,205,436 B1 | 3/2001 | Rosen |
| 6,205,437 B1 | 3/2001 | Gifford |
| 6,208,980 B1 | 3/2001 | Kara |
| 6,220,509 B1 | 4/2001 | Byford |
| 6,236,972 B1 | 5/2001 | Shkedy |
| 6,240,396 B1 | 5/2001 | Walker et al. |
| 6,285,916 B1 | 9/2001 | Kadaba et al. |
| 6,289,323 B1 | 9/2001 | Gordon et al. |
| 6,343,275 B1 | 1/2002 | Wong |
| 6,356,196 B1 | 3/2002 | Wong et al. |
| 6,401,078 B1 | 6/2002 | Roberts et al. |
| 6,460,020 B1 | 10/2002 | Pool et al. |
| 6,463,420 B1 | 10/2002 | Guidice et al. |
| 6,474,927 B1 | 11/2002 | McAdams et al. |
| 6,510,992 B2 | 1/2003 | Wells et al. |
| 6,539,360 B1 | 3/2003 | Kadaba |
| 6,571,213 B1 | 5/2003 | Atendahl et al. |
| 6,610,955 B2 | 8/2003 | Lopez |
| 6,634,551 B2 | 10/2003 | Barta et al. |
| 6,785,718 B2 | 8/2004 | Hancock et al. |
| 6,795,823 B1 | 9/2004 | Aklepi et al. |
| 6,808,114 B1 | 10/2004 | Palestini et al. |
| 6,845,364 B1 | 1/2005 | Pool et al. |
| 6,845,909 B2 | 1/2005 | Bong et al. |
| 6,866,195 B2 | 3/2005 | Knowles |
| 6,878,896 B2 | 4/2005 | Braginsky et al. |
| 6,913,202 B2 | 7/2005 | Tsikos et al. |
| 6,970,825 B1 * | 11/2005 | Altendahl et al. ............ 705/330 |
| 6,974,928 B2 | 12/2005 | Bloom |
| 7,050,995 B2 | 5/2006 | Wojcik et al. |
| 7,366,770 B2 * | 4/2008 | Hancock et al. ............. 709/219 |
| 7,426,484 B2 | 9/2008 | Joyce et al. |
| 2001/0018672 A1 | 8/2001 | Petters et al. |
| 2001/0027471 A1 | 10/2001 | Paulose et al. |
| 2001/0042055 A1 | 11/2001 | Didrikesen et al. |
| 2002/0010634 A1 | 1/2002 | Roman et al. |
| 2002/0010665 A1 | 1/2002 | Lefebvre et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0032573 A1 | 3/2002 | Williams et al. |
| 2002/0032612 A1 | 3/2002 | Williams et al. |
| 2002/0038267 A1 * | 3/2002 | Can et al. ........................ 705/28 |
| 2002/0046130 A1 | 4/2002 | Monteleone |
| 2002/0065738 A1 | 5/2002 | Riggs et al. |
| 2002/0069096 A1 * | 6/2002 | Lindoerfer et al. ................ 705/7 |
| 2002/0073039 A1 | 6/2002 | Ogg et al. |
| 2002/0077915 A1 | 6/2002 | Goto et al. |
| 2002/0091574 A1 | 7/2002 | Lefebvre et al. |
| 2002/0095308 A1 * | 7/2002 | Pragelas et al. .................... 705/1 |
| 2002/0095355 A1 | 7/2002 | Walker et al. |
| 2002/0116318 A1 | 8/2002 | Thomas et al. |
| 2002/0120561 A1 | 8/2002 | Chin et al. |
| 2002/0152112 A1 | 10/2002 | Myers et al. |
| 2002/0184119 A1 | 12/2002 | Gagne et al. |
| 2002/0198752 A1 | 12/2002 | Stiffler |
| 2003/0004735 A1 | 1/2003 | Dutta et al. |
| 2003/0009361 A1 | 1/2003 | Hancock et al. |
| 2003/0009396 A1 | 1/2003 | DeVries et al. |
| 2003/0023522 A1 | 1/2003 | Dutta et al. |
| 2003/0036982 A1 | 2/2003 | Tang et al. |
| 2003/0037009 A1 | 2/2003 | Tobin et al. |
| 2003/0040947 A1 | 2/2003 | Alie |
| 2003/0041033 A1 | 2/2003 | Kaplan |
| 2003/0046220 A1 | 3/2003 | Kamiya |
| 2003/0061058 A1 | 3/2003 | Dutta et al. |
| 2003/0069831 A1 | 4/2003 | Le et al. |
| 2003/0078885 A1 | 4/2003 | Felton et al. |
| 2003/0097287 A1 | 5/2003 | Franz |
| 2003/0115072 A1 | 6/2003 | Manucha et al. |
| 2003/0144863 A1 | 7/2003 | Liu |
| 2003/0154143 A1 | 8/2003 | Chen |
| 2003/0167240 A1 | 9/2003 | Napier et al. |
| 2003/0171948 A1 | 9/2003 | Thomas et al. |
| 2003/0191652 A1 | 10/2003 | Li et al. |
| 2003/0195784 A1 | 10/2003 | Smith, Jr. |
| 2003/0195815 A1 | 10/2003 | Li et al. |
| 2003/0212631 A1 * | 11/2003 | Foth et al. ........................ 705/40 |
| 2003/0236688 A1 | 12/2003 | Kadaba et al. |
| 2004/0019569 A1 | 1/2004 | Lee et al. |
| 2004/0088245 A1 | 5/2004 | Narayan et al. |
| 2004/0098356 A1 | 5/2004 | Shabtai |
| 2004/0215480 A1 | 10/2004 | Kadaba |
| 2004/0215588 A1 | 10/2004 | Cornelius |
| 2005/0006470 A1 | 1/2005 | Mrozik |
| 2005/0060164 A1 | 3/2005 | Eli Berl Illion |
| 2005/0102154 A1 | 5/2005 | Dodd et al. |
| 2006/0053027 A1 | 3/2006 | Riggs et al. |

FOREIGN PATENT DOCUMENTS

| | | |
|---|---|---|
| EP | 1 244 038 A1 | 9/2002 |
| JP | 11-296581 | 10/1999 |
| JP | 2002-240951 | 8/2002 |
| WO | WO 96/08783 | 3/1996 |
| WO | WO 00/00300 | 6/1999 |
| WO | WO 99/34272 | 7/1999 |
| WO | WO 00/30014 A1 | 5/2000 |
| WO | WO 00/46726 | 8/2000 |
| WO | WO 00/52555 | 9/2000 |
| WO | WO 01/16889 A1 | 3/2001 |
| WO | WO 01/18712 | 3/2001 |

(56) References Cited

FOREIGN PATENT DOCUMENTS

| | | |
|---|---|---|
| WO | WO 01/29778 A1 | 4/2001 |
| WO | WO 01/35344 A2 | 5/2001 |
| WO | WO 01/65454 A2 | 9/2001 |
| WO | WO 01/67344 A1 | 9/2001 |
| WO | WO 01/72109 A2 | 10/2001 |
| WO | WO 01/77848 | 10/2001 |
| WO | WO 01/88831 A2 | 11/2001 |
| WO | WO 02/07104 A1 | 1/2002 |
| WO | WO 02/17045 A2 | 2/2002 |
| WO | WO 02/052378 A2 | 7/2002 |
| WO | WO 02/54172 A2 | 7/2002 |
| WO | WO 02/101505 A2 | 12/2002 |
| WO | WO 03/019333 A2 | 3/2003 |
| WO | WO 03/069533 | 8/2003 |

OTHER PUBLICATIONS

United States Patent and Trademark Office, Office Action for U.S. Appl. No. 12/816,919, dated Jan. 16, 2013, 17 pages, USA.
Office Communication from corresponding U.S. Appl. No. 11/026,535 dated Apr. 29, 2009.
Office Communication from corresponding U.S. Appl. No. 11/026,539 dated Mar. 20, 2009.
Office Communication from corresponding U.S. Appl. No. 11/026,500 dated May 27, 2009.
Office Communication from corresponding U.S. Appl. No. 11/026,535 dated May 15, 2008.
Office Communication from corresponding U.S. Appl. No. 11/026,500 dated May 14, 2008.
Office Communication from corresponding U.S. Appl. No. 11/026,539 dated May 14, 2008.
Office Communication from corresponding U.S. Appl. No. 11/026,535 Dated Dec. 9, 2008.
Office Communication from corresponding U.S. Appl. No. 10/366,111 dated Oct. 5, 2007.
English Translation of Official Office Action for corresponding Patent Application No. JP 2003-568587 dated Jul. 27, 2007.
PCT Notification of Transmittal of the International Search Report and the Written Opinion of The International Searching Authority, or the Declaration, mailed Nov. 22, 2004 for PCT/US2004/012610 (Filed Apr. 22, 2004).
PCT Notification of Transmittal of the International Search Report and Declaration, received Jul. 10, 2003 for PCT/US2003/04637 (Filed Feb. 13, 2003).
International Search Report from corresponding International Application No. PCT/US04/43975 received Feb. 23, 2007.
Michael Connor; UPS, FedEx Turn to US Post Agency to Test Services, *Reuters*, 2 pages, dated Nov. 6, 2003.
Chudleigh, Michael; Sheppard, Maria; Revenue Canada Helping Canadian Companies Save Time and Money.Electronic Commerce (2 of 5 Documents); CMA—The Management Accounting Magazine; Jun. 1995; pp. 1-3; vol. 69; No. 5; p. 22; ISSN: 0831-3881; Canada.
Penney's Import Automation: J.C. Penney and Company Inc. Uses Automated International Sourcing System (4 of 5 Documents); Chain Store Agee Executive With Shipping Center Age; Dec. 1994, pp. 1-5; vol. 70; No. 12, p. 80; ISSN: 0193-1199.
Feldman, Joan M.; Documentation: The Tie That Binds (5 of 5 Documents); Handling & Shipping Management; pp. 1-4; vol. 25; p. 56; ISSN: 0914-603X.
Delia-Loyle, Donna; Automated Services for International Trade: Directory; Global Trade; Feb. 1992; pp. 1,7-10; vol. 112; p. 22; ISSN: 1060-0906.
Grantham, Russell, "UPS Customers Can Get Upgraded Online Tracking of Packages," Newspaper, *The Commercial Appeal*, Jun. 23, 2999, ISSN: 07454856, 44945801, Memphis, TN, Retrieved from the internet on Nov. 21, 2006 <http://proquest.umi.com/pqdweb?index=6&sid=5&srchmode=1&vinst=PROD&fmt=3&s>.
Alessandra Losciale, "Companies: Federal Express, French Post Office to Form Alliance—Deal is Seen as Beneficial to Both Sides," Newspaper, *Wall Street Journal*, Sep. 12, 2000, ProQuest document ID: 59893272, Europe, Brussels, Retrieved from the internet on Nov. 21, 2006, http://proquest.umi.com/pqdweb?index=40&did=5983272&SrchMode=1&said=3&Fmt=>.
Cygnus Interactive, a division of Cygnus Business Media, Cross-Border Trade: "Keeping On Top of Customs Regulations," by Jerry DelGaudio, printed three pages from the Internet. Copyright 2004.
DE Tech and Trade Direct and GIF, "Over There Untangling The Complexities of Foreign Order Fulfillment," by Paul Miller. Four pages printed Jun. 2005.
Food USA Navigator.com, "Breaking News on Food & Beverage Development—North America, DHL Launches A Virtual Warehouse for Importers," Jan. 5, 2006, two page article.
DHL Press Release—DHL Launches Virtual Warehouse for U.S. Importers, DHL Danzas Air & Ocean Consolidated Distribution Service (CDS) Streamlines Supply Chain for U.S. Importers Plantation Florida, Nov. 2, 2005.
Pender, Lee, Hard Times Are The Best Times, Magazine, Aug. 15, 2001 (Retrieved on Apr. 25, 2003), p. 3, Paragraph 3, Retrieved from the Internet: <URL:http://cio.com/archive/081501/besttimes_conent.htm>.
Frontline Solutions, FedEx Improves Internal, External Operaions, Article, Apr. 5, 2001 (Retrieved from the Internet Apr. 25, 2003) p. 1 (last line) through p. 2, Paragraph 9, Retrieved from the Internet: <URL:http://www.frontlinemagazine.com/art_th/o4052001.htx>, Fairfax, Virginia and Memphis, Tennessee.
Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.
Van Huzien, Gordon, Messaging: The Transport Part of The XML Puzzle, Article, Jul. 2000 (Retrieved from the Internet Apr. 25, 2003: <URL:http://www-106.ibm.com/developerworks/library/xml-messaging/>.
Ann Keeton, Dow Jones, New Competitors to Challenge Shipping Industry Study, Article, Aug. 10, 2005 (copy attached sent via email).
Chudleigh, Michael, Sheppard, Maria, Revenue Canada Helping Canadian Companies Save Time and Money, Electronic Commerce, Article, Jun. 1995, 3 pages; vol. 69, No. 5; p. 22, ISSN: 0831-3881.
Information Access Company, Copyright 1994, Penney's Import Automation: J.C. Penney and Company Uses Automated International Sourcing System, Article, Dec. 1994; 2 pages, vol. 70, No. 12, p. 80, ISSN: 0193-1199.
Delia-Loyle, Donna, Automated Services for International Trade, Directory, Article, 5 pages, Feb. 1992; vol. 112; No. 2, p. 22, ISSN: 1060-0906.
Feldman, Joan M., Documentation: The Tie That Binds, Article, Jul. 1984, 4 pages, vol. 25, p. 56, ISSN: 0194-603X.
Brent Meyers, FedEx Services—Digitizing The Supply Chain for Maximum Impact, FedEx Confidential & Proprietary 2002; brochure—24 pages.
Fed Express Sprint Draft, brochure pages, Aug. 2003, 9 pages, BIA (Business Information & Analysis Competitive Analysis Group).
Harry R. Weber; UPS to Test Service for Direct Marketers, *Associated Press*, 2 pages, dated Nov. 6, 2003.
UPS Turns to Postal Service, *CNN Money*, 2 pages, available at http://www.cnnmoney.com; article dated Nov. 6, 2003; downloaded Nov. 11, 2003.
FedEx, UPS turn to Postal Service, *Memphis Business Journal*, 1 page, available at http://memphis.bizjournal.com/memphis/stories/2003/11/03/daily33.html; dated Nov. 6, 2003; downloaded Nov. 11, 2003.
UPS, FedEx turn to U.S. Post Office, *The Journal of Commerce Online*, 1 page, available at www.joc.com; dated Nov. 6, 2003; downloaded Nov. 11, 2003.
UPS: US United Parcel Service Inc., *Bloomberg*, 3 pages, available at www.bloomberg.com; dated Nov. 7, 2003, downloaded Nov. 11, 2003.
Bill Mongelluzzo; Shipping Act Change Coming, But Only for UPS, FedEx?, *Journal of Commerce Online*, 2 pages, available at www.joc.com; dated Nov. 4, 2003.
Rick Brooks; New UPS Delivery Service Sends Packages Through the Post Office, *The Wall Street Journal*, 3 pages, dated Nov. 6, 2003.

(56) References Cited

OTHER PUBLICATIONS

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiany With New Solution, Periodical, Nov. 2000, Downloaded from the Internet on Oct. 3, 2002, pp. 72-76, vol. 82n11, Accession No. 02102731, ProQuest Info&Learning, United States of America.

El Portal Del Transporte, FedEx Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <URL:http://www.transportando.net/newsabril_completa.htm>.

Many Happy Returns—UPS Unvels Advanced Outline Returns Solution, Journal, Sep. 20, 2000, Downloaded from the Internet on Oct. 3, 2002, Accession No. 12921102, Business Wire, United States of America.

Zone Skipping; *Parcel Direct*; 2 pages found at http://www.parceldirect.com/our_approach/zone_skipping.asp (which dates back to Oct. 24, 2001) which were the search results from http://www.waybackmachine.org/.

Technology; *Parcel Direct*; 1 page, available at http://www.parceldirect.com/our_approach/technology_more.asp; originated Aug. 12, 2002; downloaded Jun. 16, 2005.

Process Demo—Pick-up, Induction, Scanning, Sortation, Bed Loading, Palletization, Staging and Delivery; *Parcel Direct*; 9 pages, available at http://www.parceldirect.com/our_approach/process.asp; originated Aug. 4, 2002; download Jun. 16, 2005.

Japanese Office Action from corresponding Japanese Patent Application No. 2006-547580 dated Jul. 9, 2009.

Stank et al., "A Framework for transportation decision making in an integrated supply chain," 2000, vol. 5, Issue 2, p. 71. Retrieved Aug. 6, 2010 from ABI/INFORM Global. (Document ID: 86923287).

Dilger, "Strategic moves," Manufacturing Systems (Feb. 1998), vol. 16, Issue 2, pp. 80-86. Retrieved Aug. 6, 2010 from ABI/INFORM Global (Document ID: 26858604).

Notice of Allowance dated Aug. 10, 2010 of related U.S. Appl. No. 11/026,500, filed Dec. 30, 2004.

Notice of Allowance dated Jul. 2, 2010 of corresponding U.S. Appl. No. 12/506,734, filed Jul. 21, 2009.

United States Patent and Trademark Office, Office Action for U.S. Appl. No. 12/816,919, dated Sep. 20, 2012, 17 pages, USA.

Office Action dated Jan. 21, 2011 or related U.S. Appl. No. 12/816,919, filed Jun. 16, 2010.

United States Patent and Trade Mark Office, Office Action for U.S. Appl. No. 12/816,919, filed Jul. 19, 2013, 14 pages, USA.

United States Patent and Trade Mark Office, Office Action for U.S. Appl. No. 12/894,527, filed Sep. 6, 2013, 24 pages, USA.

\* cited by examiner

Global View Query Display - Microsoft Internet Explorer

Manage Shipments | Track Customs Entries | Track Purchase Orders | Track Inventory | Reports Search Results
Air results for File Date throu January 1, 2000 to January 20, 2000

Page Help
☐ Save this search
☐ Download Results

| Rec | Housebill/Fordr Ref/Truckbill | Product Line (A, D, O, S) | Shipper Web Bus ID | Original Destination | File Date | Status Date | Latest Status |
|---|---|---|---|---|---|---|---|
| 1 | ACMEHBL9 | A | ACME | USSFO MKHKG | 12 JAN 2000 | | |
| 2 | A18HBL | A | ACME | USSFO MKHKG | 01 JAN 2000 | 16 JAN 2000 | DOGS DLVRD TO BRKR/CNEE |
| 3 | ACMEHAWB7 | A | ACME | USSFO MKHKG | 12 JAN 2000 | | |
| 4 | ACMEH5L6 | A | ACME | USSFO MKHKG | 12 JAN 2000 | | |
| 5 | ACMEHAWB | A | ACME | USSFO MKHKG | 01 JAN 2000 | | |
| 6 | ACMEHBLI | A | ACME | USSFO MKHKG | 11 JAN 2000 | | |
| 7 | TESTHBL | A | ACME | USSFO MKHKG | 12 JAN 2000 | | |
| 8 | SEAGATETEST | A | ACME | USSFO MKHKG | 12 JAN 2000 | 12 JAN 2000 | PICK UP/ GOODS COLLECTED |
| 9 | TESTRDLA1 | A | ACME | USSFO MKHKG | 01 JAN 2000 | 20 NOV 2001 | PICK UP/ GOODS COLLECTED |

☐ Download Results

*Back to Top | UPS Supply Chain Solutions | UPS Corporate | UPS Global
Copyright © 1994-2003 United Parcel Service of America, Inc. All Rights Reserved

FIG. 17

| Home | My Profits | Global View | | | UPS Supply Chain Solutions* UPS Internet |
|---|---|---|---|---|---|
| Manage Shipments | Track Customs Entries | Track Purchase Orders | Track Inventory | Reports | Page Help |

Truck Bill Details

Header Information  
House Bill    ACME-SURF-DEMO  
Origin    IEDUS, DUSLIN  
Destination    XXXXX, XXXXXXX  
Shipper    ACMODEMO, ACMO DEMO  
Shipper Cnam    ACMEDEMO  
Consignee    ACMECHILD, ACME DEMO CHILD  
Consignee Cnam    ACMECHILD  
Principal    ACMEDEMO, ACME DEMO  
Principal Cnam    ACMEDEMO  
Delay Code    ACT OF GOD/ FORCE XXXXXXX  
Data Source    WEC  
Description    CRYSTAL VASES  
Customer Ref File Number    XXXXXXXXX  
File Date    01-APR-2000  
Pieces    1000  
Weight    3,000.0 KGS Office Number    999

ROSE OF TRAVEL

| | Trk Id/Vny/Pit | Description | Depart Date | Arrive Date | Routing Information |
|---|---|---|---|---|---|
| Routing Information Status Carrier | 123-1 | XXXXXXXX<br>XXXXXXXX | 01 MAY 2000<br>23:59 | 02 MAY 2000<br>02:30 | XXX 12:45 |

Actual    UNITED PARCEL SERVICE INC  
Associated Shipments

Delivery Order ▼

| Shipment | Consignee xxxxx | Consignee xxxxx | Origin | Destination | Latest Status | Date/Time |
|---|---|---|---|---|---|---|
| ABC123 | Xxxxxxx Xxxxx | UPS SCS | Xxxxx Xxxxxxx | Xxxxx Xxxxxxx | Acted-Up | 03 MAY 2003 12:00 |
| DEF416 | Xxxxxxx Xxxxx | UPS SCS | Xxxxx Xxxxxxx | Xxxxx Xxxxxxx | Acted-Up | 03 MAY 2003 12:00 |
| ABC123 | Bun Burdridge | UPS SCS | Xxxxx Xxxxxxx | Xxxxx Xxxxxxx | Acted-Up | 03 MAY 2003 12:00 |
| DEF416 | Bun Burdridge | UPS SCS | Xxxxx Xxxxxxx | Xxxxx Xxxxxxx | Acted-Up | 03 MAY 2003 12:00 |

Associated Sxxxxxx Packages

| Shipment | Date/Time | Destination | Outall Value | Xxxxtest Date | Svc Level | Xxxxxx | Weight |
|---|---|---|---|---|---|---|---|
| 1Z12345678 1234567 | 03-MAY-2000 10:00 | Atlanta, GA USA | | 12-Sept-03 | Ne it Ds; | 10 Page | 1000 lb |
| 1Z12345678 1234567 | | Atlanta, GA USA | | 12-Sept-03 | Ne it Ds; | 10 Page | 1000 lb |
| 1Z12345678 1234567 | | Atlanta, GA USA | | 12-Sept-03 | Ne it Ds; | 10 Page | 1000 lb |
| 1Z12345678 1234567 | | Atlanta, GA USA | | 12-Sept-03 | Ne it Ds; | 10 Page | 1000 lb |

Shipment Xxxxstones  
Description    CARGO DELIVERED TO CLIENT    Data Source WES    Last Modified By Xxxxx    Last Modified Date/Time 10-APR-2002 13:47

CARGO ARRIVED AT DESTINATION    03-MAY-2003 02:30    WED    Xxxxx    10-APR-2002 13:47

FIG. 18

| Home | My Profits | | | | UPS Supply Chain Solutions* |
|---|---|---|---|---|---|
| | | | | | UPS Internet |
| Manage Shipments | Track Customs Entries | Global View Track Purchase Orders | Track Inventory | Reports |
| | | | | Page Help |

UPS Package Summary

Results for Shipment ID 1Z1234567891234567

1Z1234567891234567
Reference 1          123
Reference 2          123             Service Type              Express
Reference 3          123             Package Weight            XXXX
Reference 4          123             Xxxxxxxx Received Date    10-Sept-03
Reference 5          123             XXX Xxx count             xx
Consignee Name       John Coe        Xxxxxxxxxx Description    Laptop 1
Consignee Attn Name  John Coe        Consignee Address         65 Second Street
                                                               Suite 400
                                                               Sun Francisco, CA 94105 US 1Z1234567891234566
Reference 1          123
Reference 2          123             Service Type              Express
Reference 3          123             Package Weight            XXXX
Reference 4          123             Xxxxxxxx Received Date    10-Sept-03
Reference 5          123             XXX Xxx count             xx
Consignee Name       John Coe        Xxxxxxxxxx Description    Laptop 1
Consignee Attn Name  John Coe        Consignee Address         65 Second Street
                                                               Suite 400
                                                               Sun Francisco, CA 94105 US 1Z1234567891234565
Reference 1          123
Reference 2          123             Service Type              Express
Reference 3          123             Package Weight            XXXX
Reference 4          123             Xxxxxxxx Received Date    10-Sept-03
Reference 5          123             XXX Xxx count             xx
Consignee Name       John Coe        Xxxxxxxxxx Description    Laptop 1
Consignee Attn Name  John Coe        Consignee Address         65 Second Street
                                                               Suite 400
                                                               Sun Francisco, CA 94105 US

FIG. 19

SYSTEMS AND METHODS FOR VIRTUAL INVENTORY MANAGEMENT

CROSS-REFERENCE TO RELATED APPLICATIONS

This application is a divisional of U.S. application Ser. No. 11/026,500, entitled "Systems and Methods For Virtual Inventory Management", filed Dec. 30, 2004 now U.S. Pat. No. 7,853,536, which claims the benefit of U.S. Provisional Application No. 60/533,300, entitled "Integrated Global Tracking and Virtual Inventory System", filed on Dec. 30, 2003, which are all hereby incorporated in their entirety by reference.

FIELD OF THE INVENTION

The present invention relates generally to an integrated tracking system that provides enhanced visibility of the movement of goods being shipped worldwide, and, as a result, enables a virtual inventory system.

BACKGROUND OF THE INVENTION

Globalization has introduced additional partners into the supply chain, thus creating new challenges of distant vendors and wide variances in the sophistication of systems. At the same time, the ever-increasing cost pressures are forcing companies to do a better job of managing expensive inventories. Under the macro-trend of operating logistics worldwide, there are some specific problems, as addressed below, which give rise to a need for an integrated global shipment system that may avoid distribution center delays and provide enhanced visibility in the movement of goods.

First of all, the current process for international shipments involves numerous entities including carriers, brokers, warehousemen and local cartage firms. As various components of goods are sourced throughout various regions and buyers are scattered around the globe, supply chains are far stretched and growing extremely complex, thus extremely complicating the efforts to provide accurate and timely data to customers. Such "piecemeal" logistics invites a number of problems, such as lack of visibility, absence of cost transparency, security concerns and unreliable service. As opposed to the prior "piecemeal" approach, therefore, a need exists for an "integrated" logistics solution from a single source that allows one specialist to synchronize the end-to-end supply-chain efforts and ensure the supply chain runs in a uniform, seamless fashion.

Another problem is the delays and high costs associated with distribution centers. Distribution centers have traditionally been considered an essential component of a consumer goods supply chain, and the reliance on distribution centers has increased in recent years as companies have moved their manufacturing facilities to overseas locations. In a traditional supply chain, distribution centers serve as warehouses where companies store large inventories of consumer goods as a safety stock cushion. Distribution centers are preferably, but not always, centrally located in a geographic region to allow the company to distribute the goods on an as-needed basis to a plurality of retail outlets disposed throughout the region. Depending on the size of the region and the immediacy of a retailer's need for a good, a company can have one or many distribution centers spread across a given geographic region. But distribution centers are expensive to operate. In addition to the cost of owning or leasing the space required to store goods, companies that rely on distribution centers invest substantial amounts of money on inventoried goods that just sit in one or more warehouses.

In an effort to lower the expense associated with operating multiple distribution centers, some companies have moved toward the nationwide distribution center model. But the single distribution center approach has its drawbacks, one of which is the inefficiencies in the transport process. For example, a company that uses a nationwide distribution center for its U.S. retailers may receive a shipment of internationally manufactured goods on the west coast. Once the goods clear customs, the goods are placed on a transportation vehicle and transported across country to the nationwide distribution center. At the distribution center, the goods are labeled with store-ready labels and with package shipment labels and the packages are picked up by a carrier such as the United Parcel Service (UPS). If the importing company is, in fact, a national chain, at least some of the imported goods are likely destined for retail outlets on the west coast. In many cases, companies will incur the time and expense to transport recently-imported goods to a distribution center, and then immediately turn-around and pay a package carrier to ship the packages back to a retail outlet on the west cost. Given the dynamic retail market, a distribution center bypass model shortens product delivery cycle and keeps inventories in motion. A recognized need therefore exists in the industry for a supply chain system that bypasses the need for distribution centers.

In addition, the need to keep track of products and information, from procurement through delivery to customers, has never been greater. Therefore, there is a trend among logistics service providers such as UPS to offer detailed status information on shipments in transit. For example, UPS customers can go to the UPS.com website and use package tracking numbers to track the status of their items in shipment. As a result, advance notification of incoming shipments can be provided to the intended recipients. However, current business trends drive the need for even heightened visibility. It relates not just to tracking shipments on the ground, water, rail or in the air, but also to how much inventory is on hand in a warehouse, where it is stored, and when it has been allocated to fulfill an order—in other words, all the activities involved in moving goods from maker to seller to buyer. This type of insight is especially desirable in the global supply chain where a company needs to respond quickly to unforeseen circumstances, cut costs and speed delivery.

BRIEF SUMMARY OF THE INVENTION

The present invention seeks to provide an integrated global shipment system that can provide end-to-end visibility of the movement of goods. To that end, the present invention provides a method integrating one or more freight shipping and tracking systems with one or more end-delivery and tracking systems. Toward that goal, the present invention enables various individual shipments to be consolidated into a freight shipment so as to facilitate the movement of goods during international shipment. Moreover, the present invention seeks to provide a virtual inventory system for enhanced inventory management. Such a virtual inventory system preferably allows suppliers to bypass distribution centers and delay allocation or distribution of goods. They can initially provide a consignee location, or re-direct the goods, after transferring possession of the goods to a carrier. For example, the carrier may receive such instructions while the goods are in transit, before or after they have arrived in a destination country, including while the goods are in a carrier facility.

In accordance with the present invention, the above objects and other objects, features, and advantages will be carried out by systems and methods for providing integrated global shipment and virtual inventory.

One embodiment of the present invention provides a virtual inventory system that bypasses distribution centers in a supply chain by using an integrated global shipment system of a carrier. The integrated global shipment system comprises: (1) a shipping client application for processing a shipment request from a supplier to generate shipping data associated with shipment of goods to a destination country; (2) a shipment entry application for receiving said shipping data to ship said shipment of goods; (3) a shipment consolidating application for generating a data file associated with a consolidated shipment, said consolidated shipment combining said shipment of goods with one or more shipments of goods that are to be shipped to said destination country; (4) a transportation application for managing transportation of said consolidated shipment to said destination country; (5) a shipment deconsolidating application for processing said data file to separate said consolidated shipment and generating a dispatch plan for resulting child shipments, said resulting child shipments comprising said shipment of goods; (6) an end-delivery application for managing delivery of said resulting child shipments to respective consignee locations; and (7) a shipment visibility application for providing an integrated interface for said supplier to track status of said shipment of goods.

In an alternative embodiment, the present invention provides a method for virtual inventory management comprising the steps of: (1) receiving from a shipper a shipment request for a carrier to ship packages, said shipment request identifying at least a destination country where said packages need to be shipped; (2) upon an approval of said shipment request by said carrier, receiving said packages from said shipper to a first operation station of said carrier; (3) receiving and processing shipping data associated with said packages in a global shipment system operated by said carrier, said global shipment system configured to generate data of a consolidated shipment, said consolidated shipment comprising said packages from said shipper with one or more shipments to be shipped to said destination country; (4) sending a notification to said shipper when said packages are received at a second operation station of said carrier in said destination country; and (5) upon said notification, receiving from said shipper specific consignee locations in said destination country so that said packages can be dispatched and delivered by said carrier to respective consignees.

According to another embodiment of the present invention, a virtual inventory management system comprises: a shipment entry system configured for a carrier to receive a request from a shipper for a shipment of goods, said request identifying at least a destination country where said goods need to be shipped; a shipment consolidating system configured to receive and process shipping data associated with said goods, and to generate data of a consolidated shipment, said consolidated shipment comprising said shipment of goods from said shipper with one or more shipments to be shipped to said destination country; and a shipment transportation system configured to transport said consolidated shipment to said destination country; a shipment de-consolidating system configured to separate said shipment of goods from said consolidated shipment after said consolidated shipment is transported to said destination country; and an end-delivery system configured to deliver said shipment of goods to one or more specific consignee locations within said destination country, wherein said one or more specific consignee locations are subject to any re-direction made by said shipper after said consolidated shipment is transported to said destination country.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
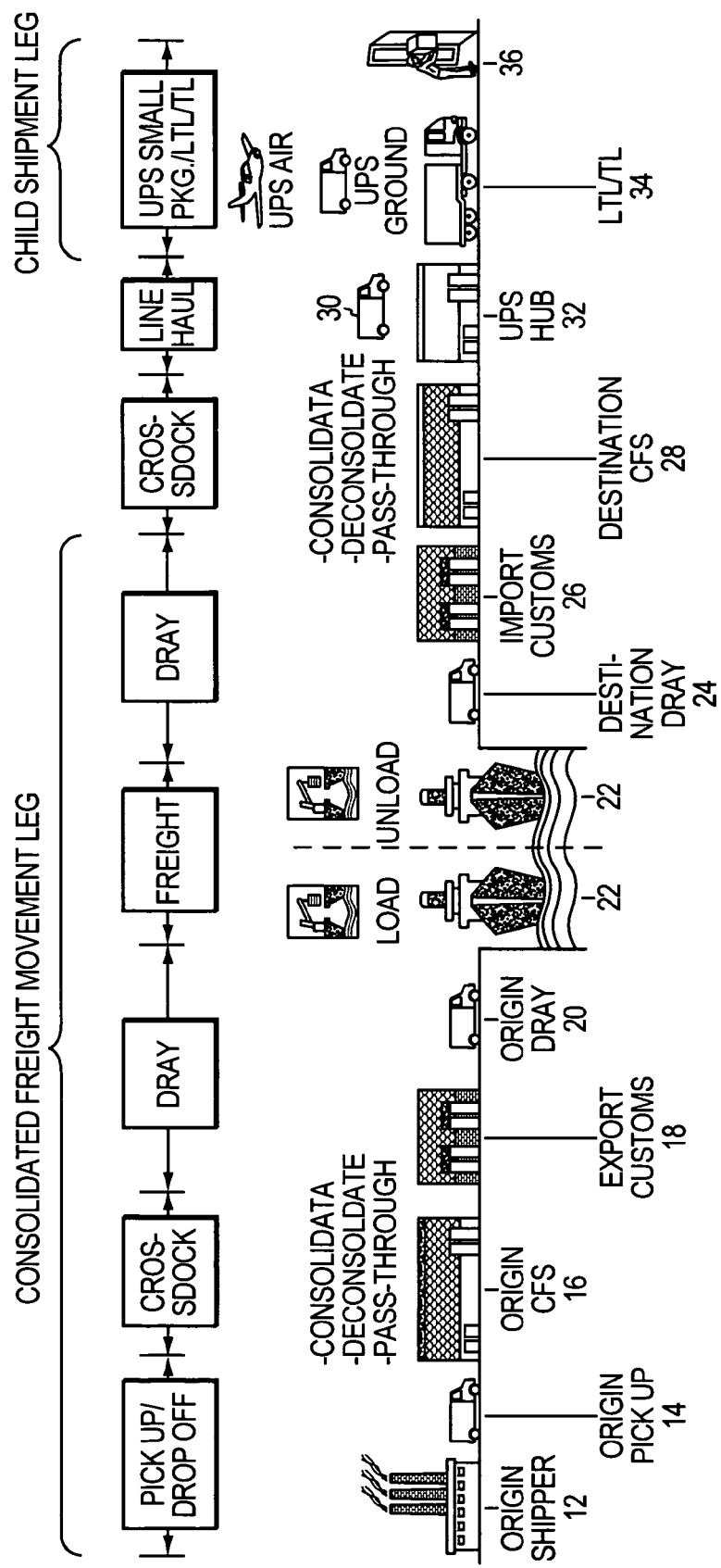
FIG. 1 is a pictorial view of an integrated global shipment system that illustrates how a good moves from an origin shipper to a consignee in accordance with an embodiment of the present invention.
Figure 3A:
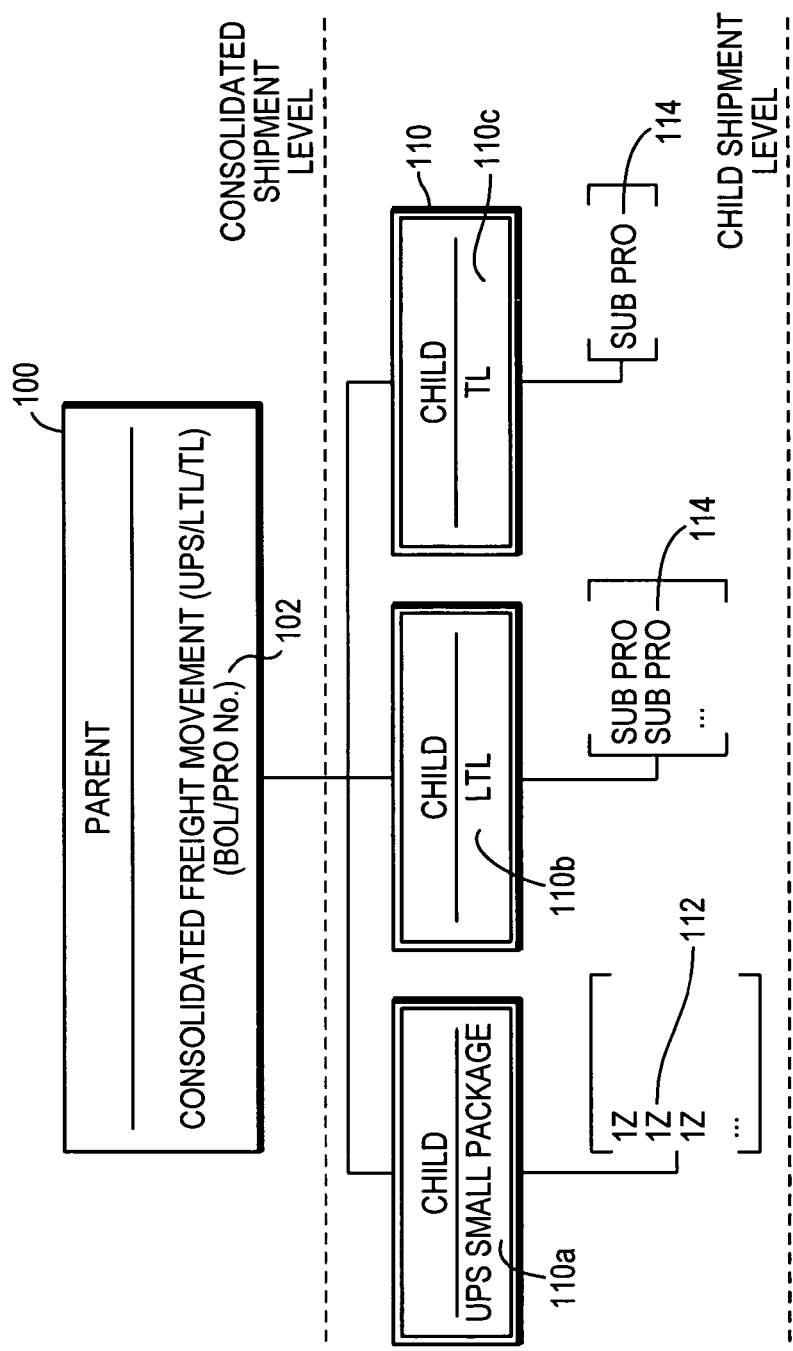
Figure 3B:
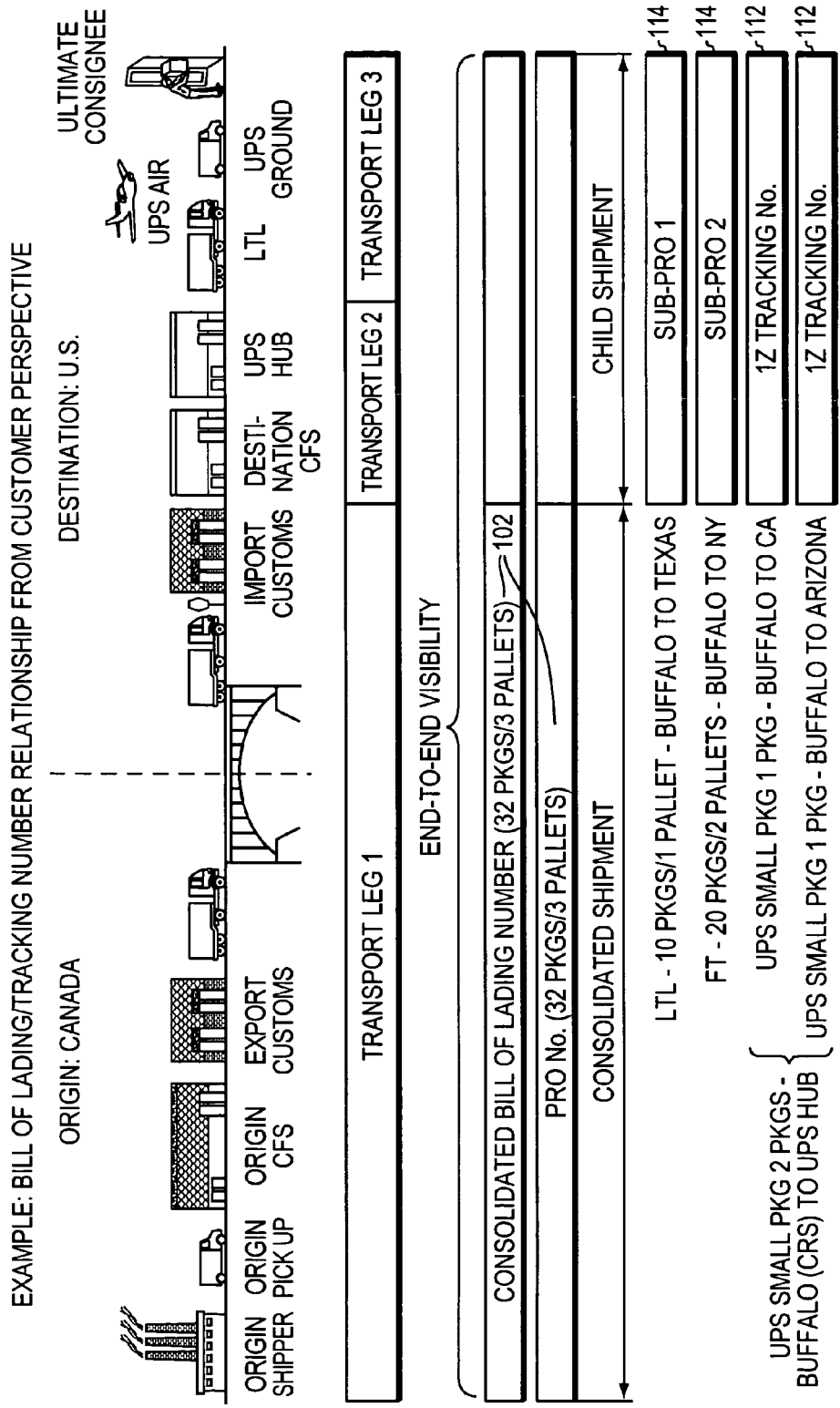
Figure 4C:
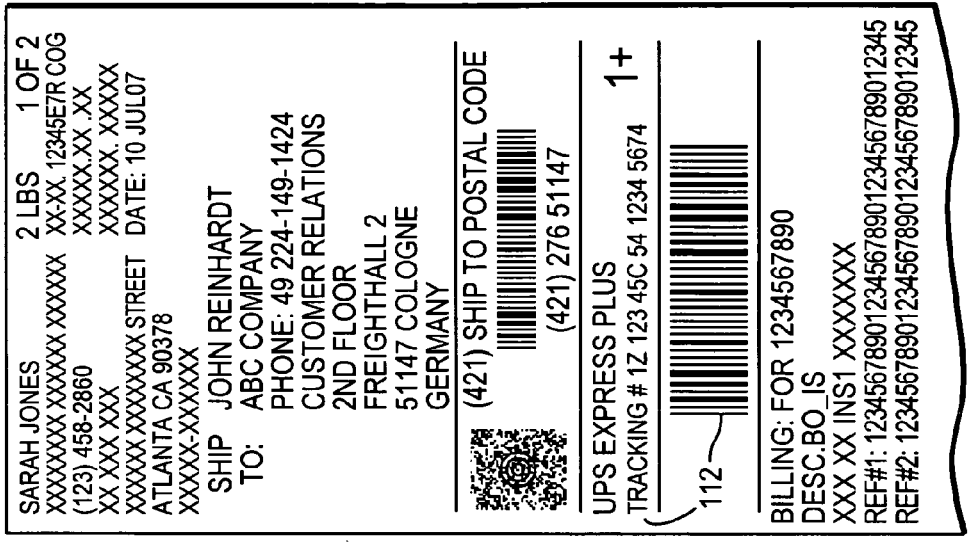
Figure 4B:
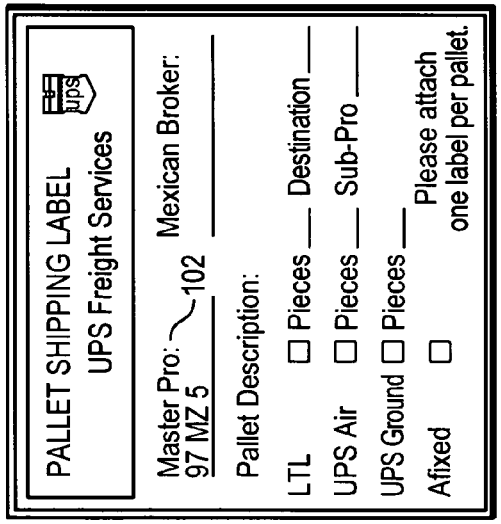
Figure 4A:
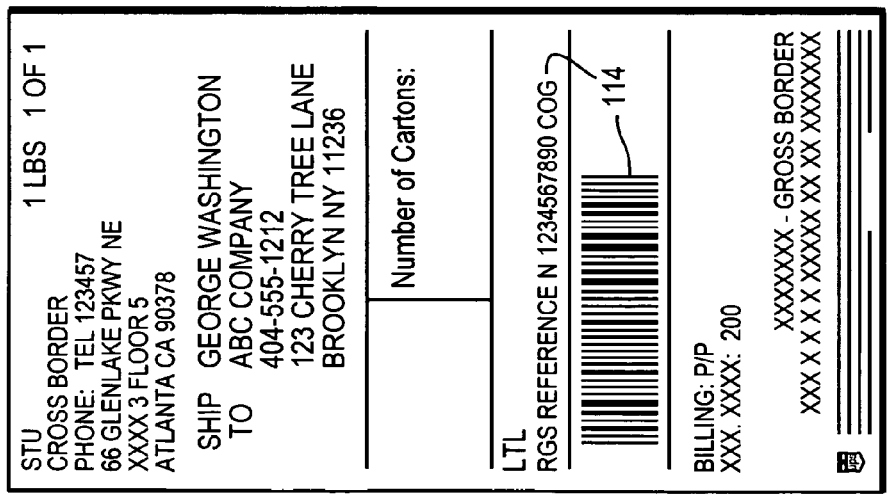
Figure 5A:
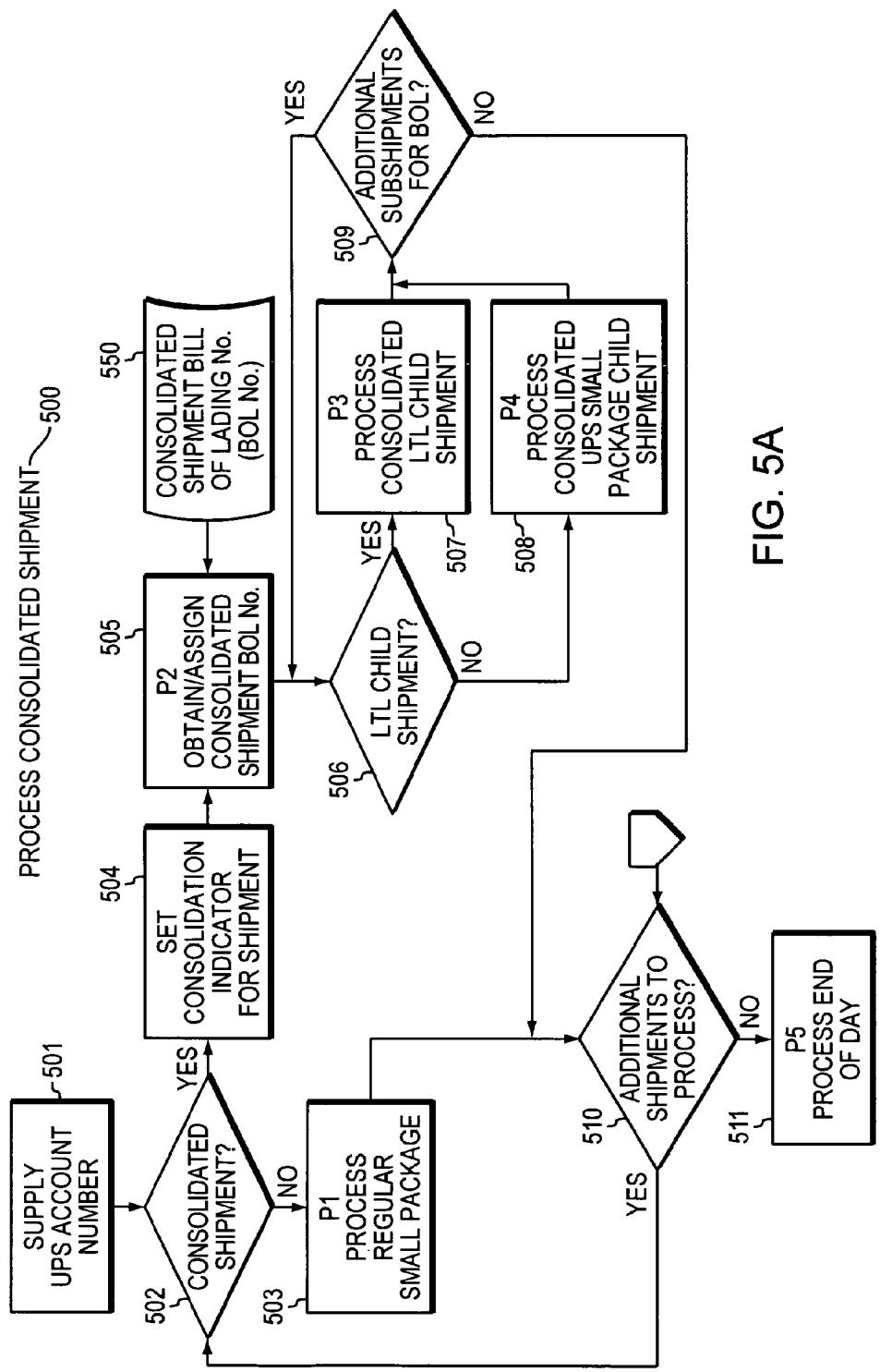
Figure 5B:
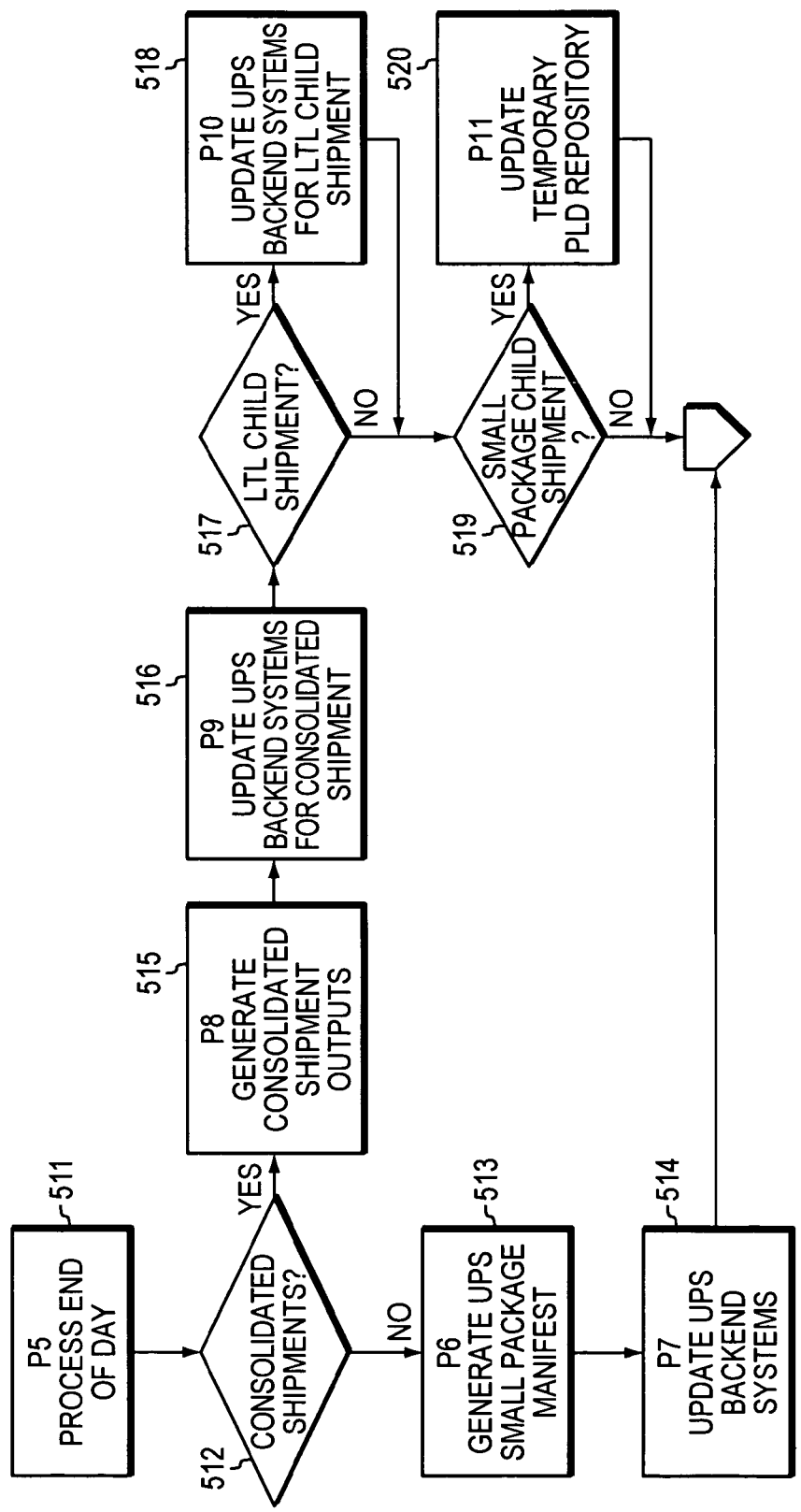
Figure 6:
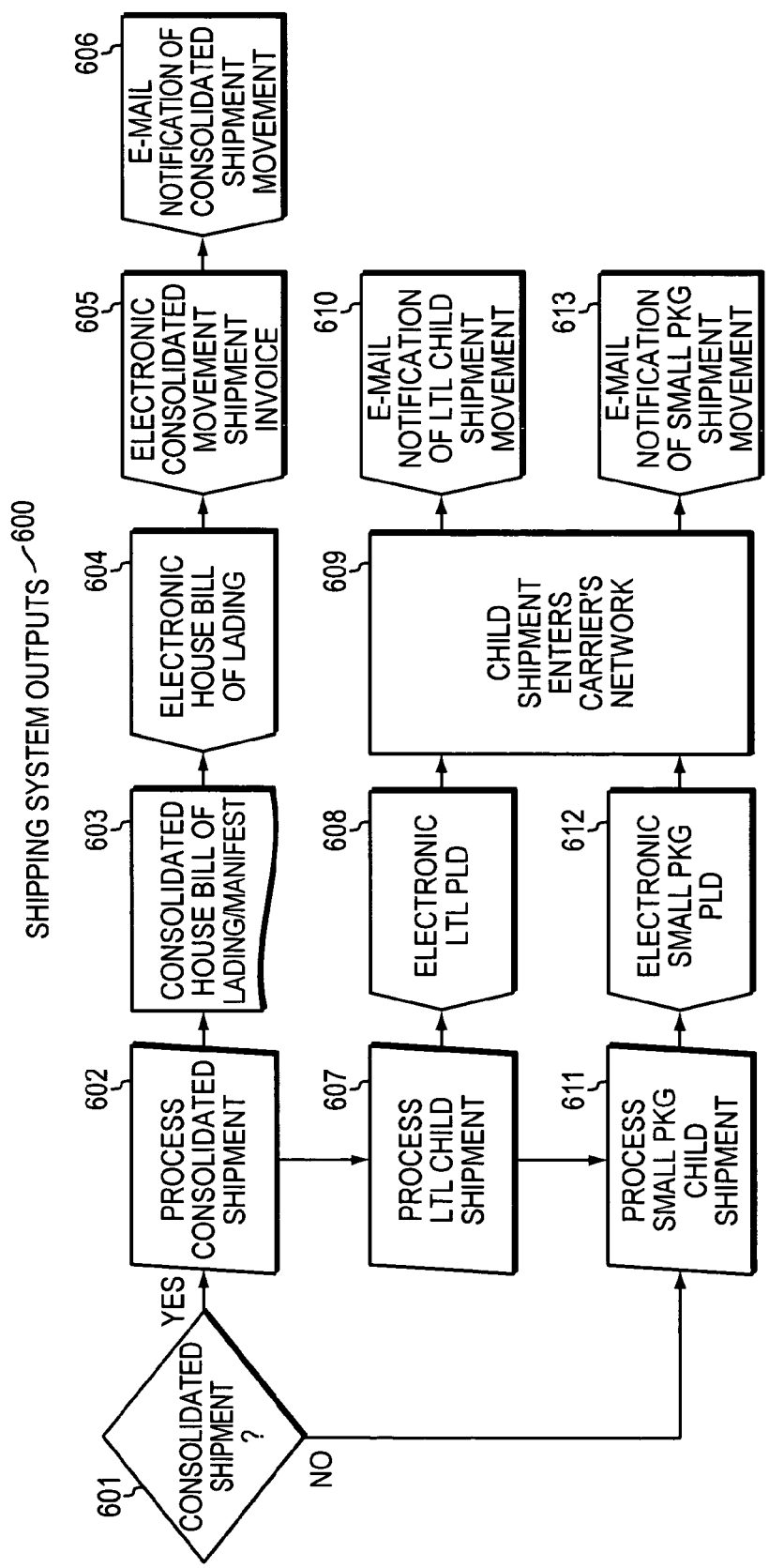
Figure 7:
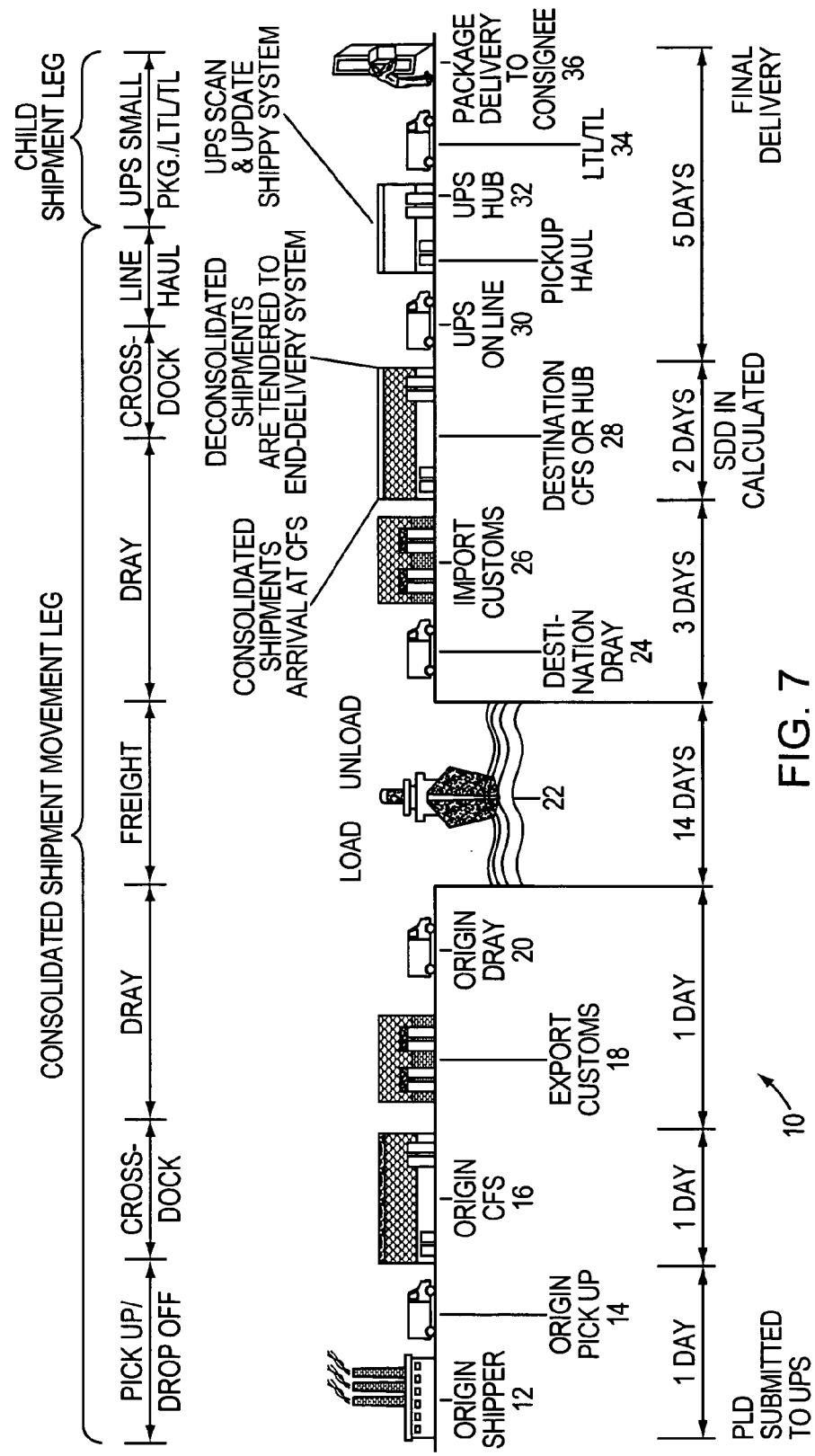
Figure 8A:
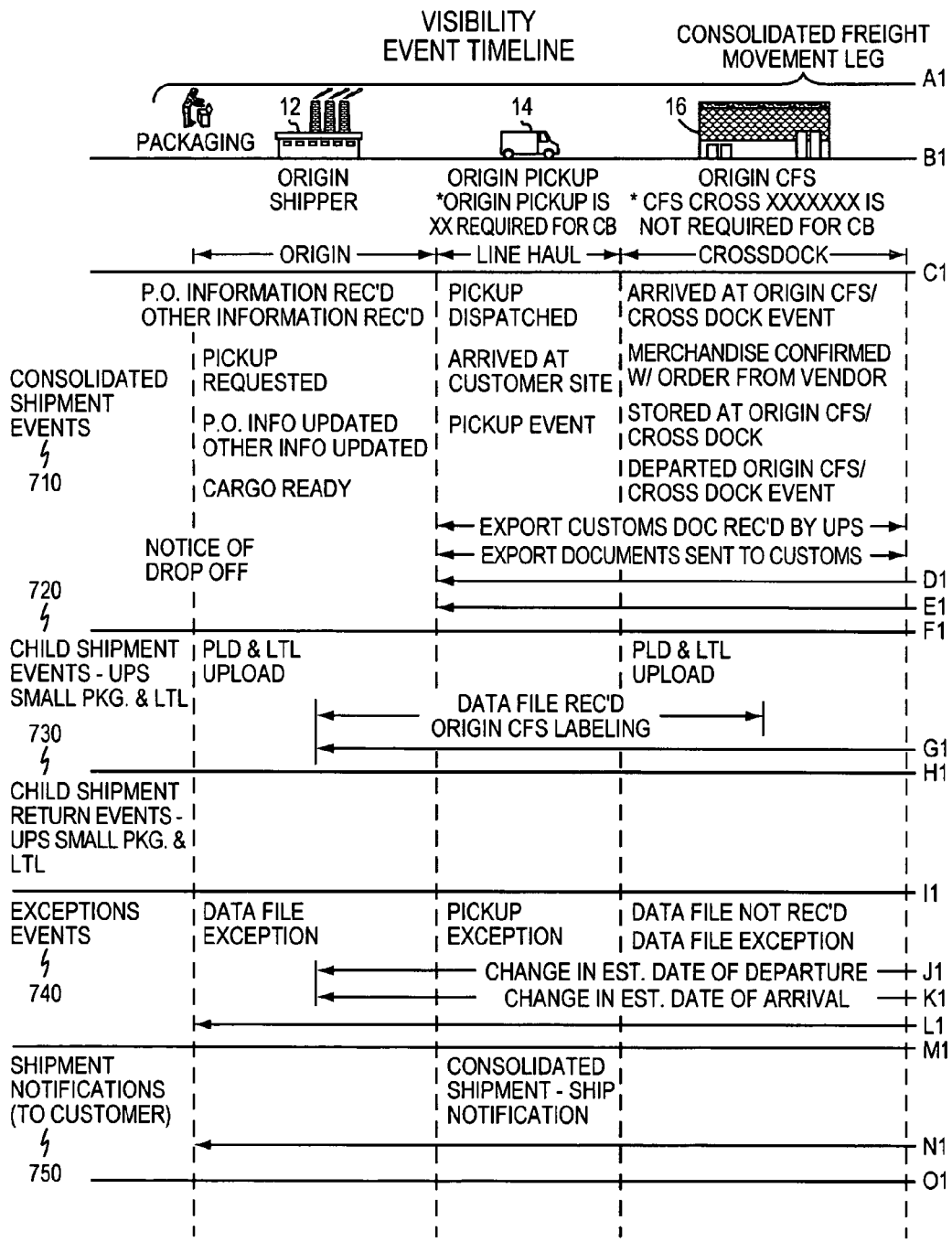
Figure 8B:
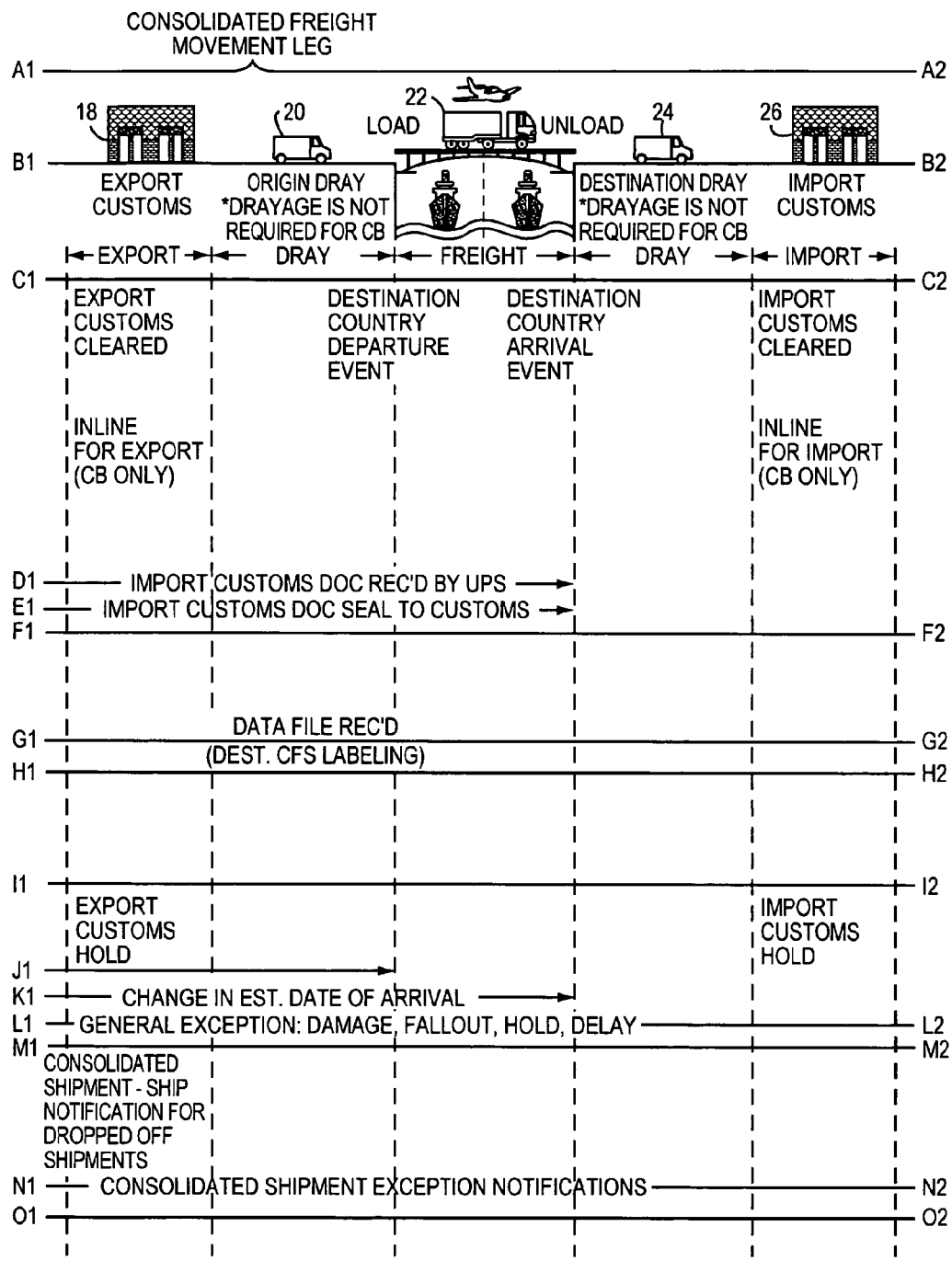
Figure 8C:
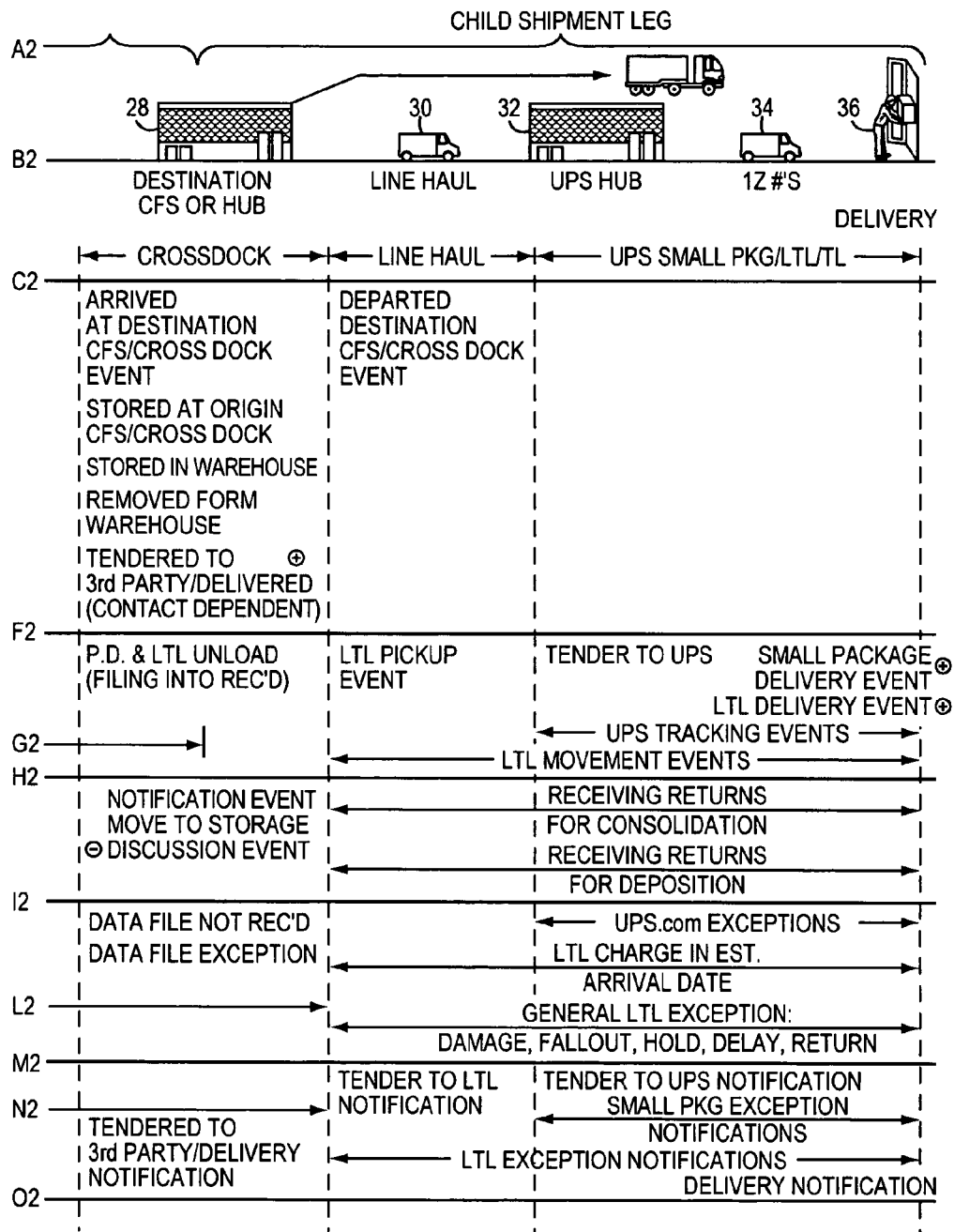
Figure 9:
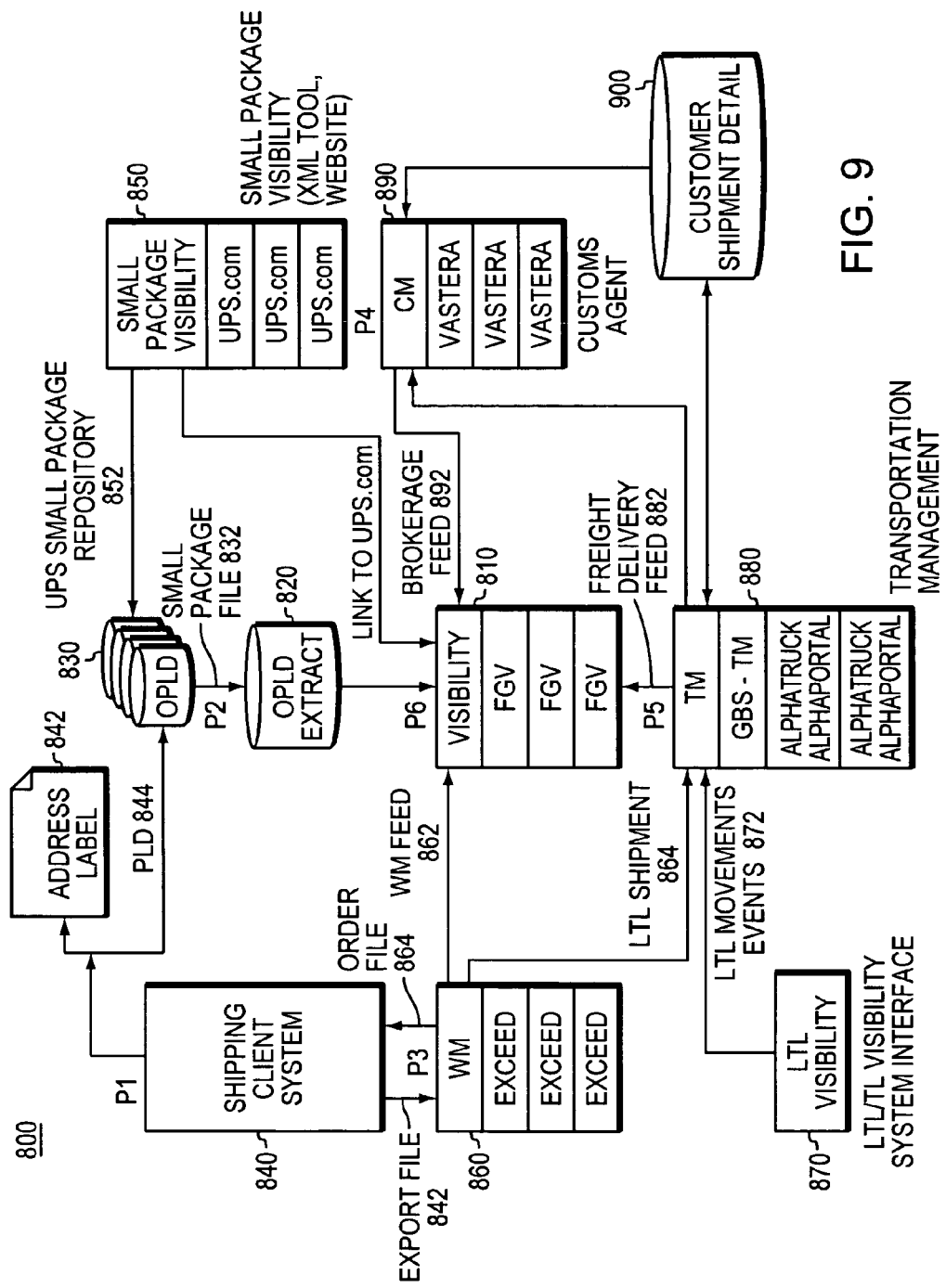
Figure 10:
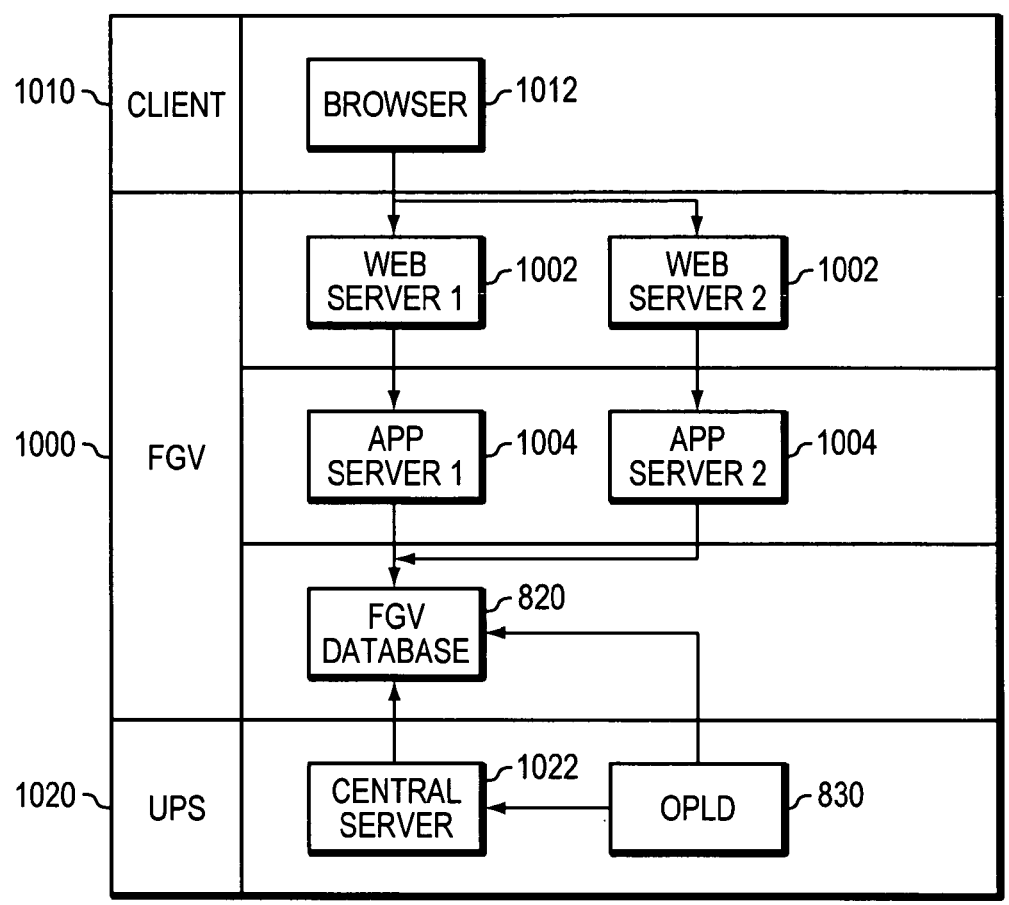
Figure 11:
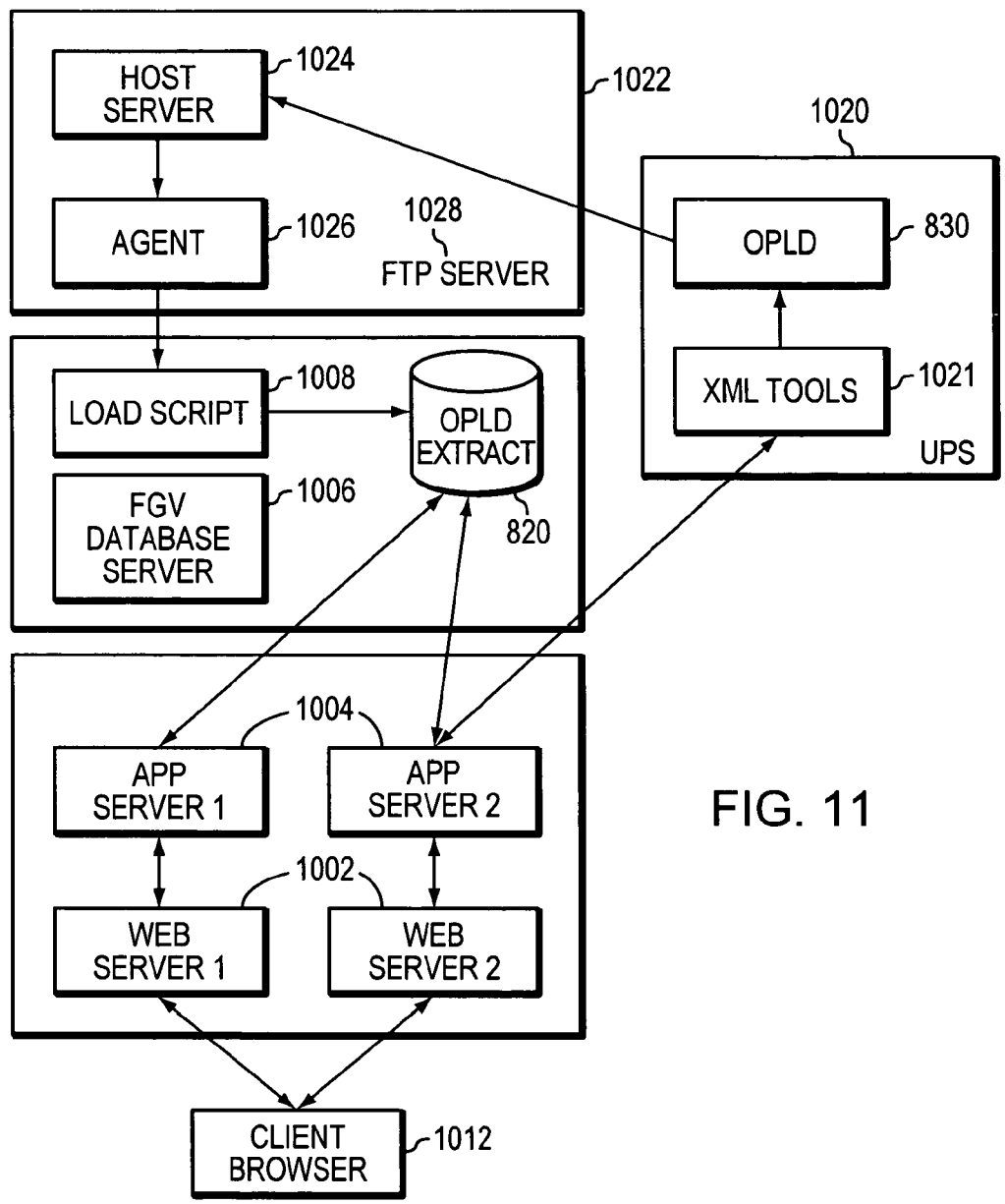
Figure 12:
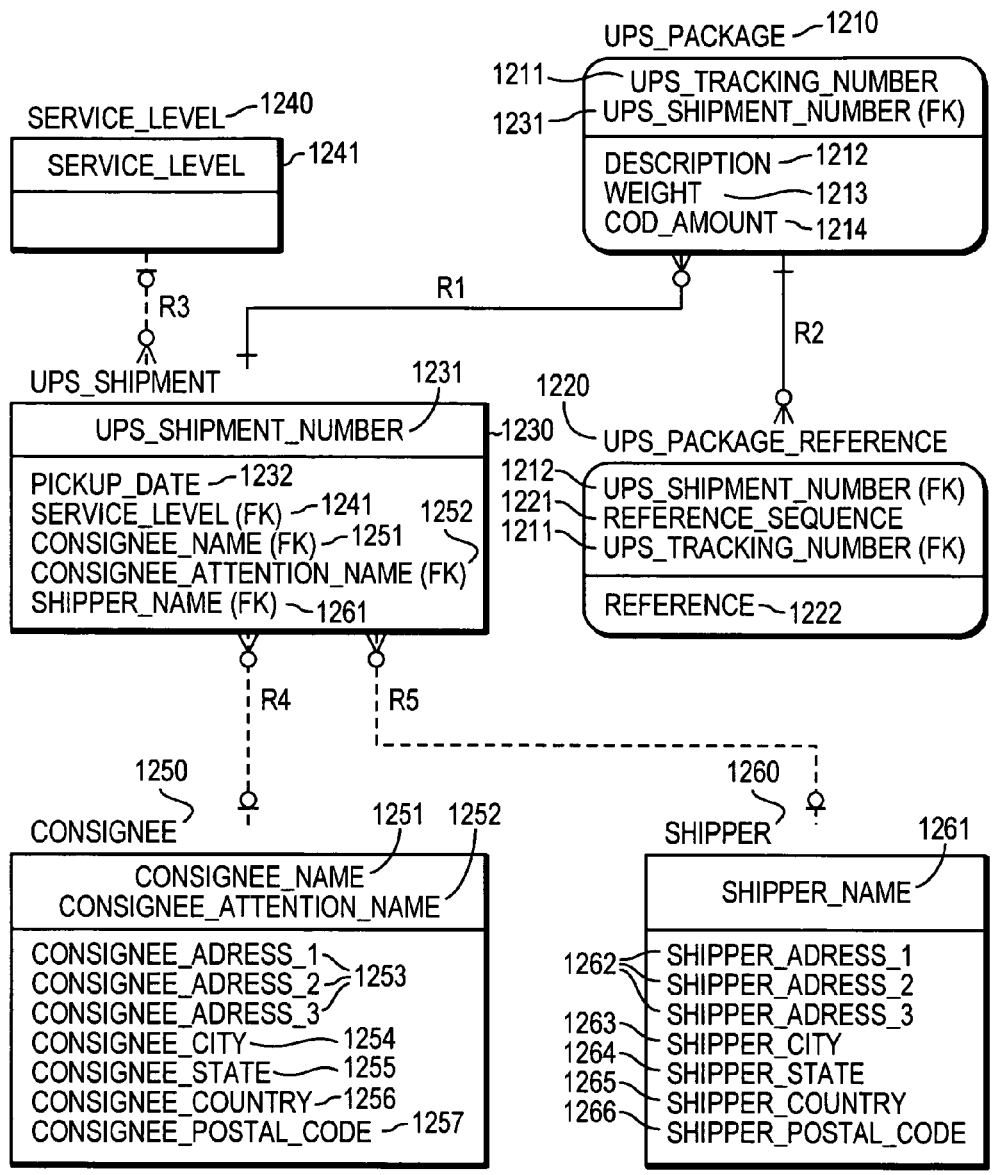
Figure 13:
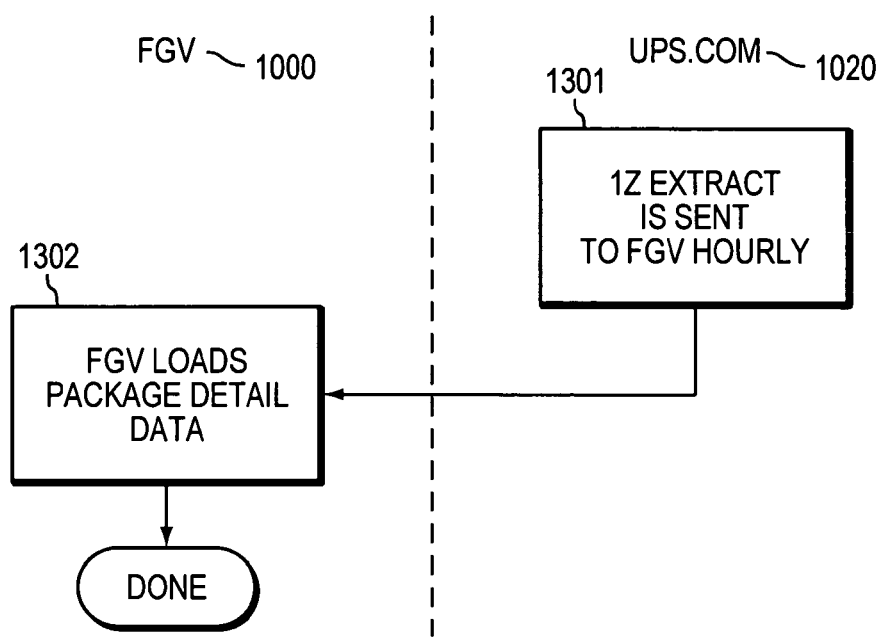
Figure 14:
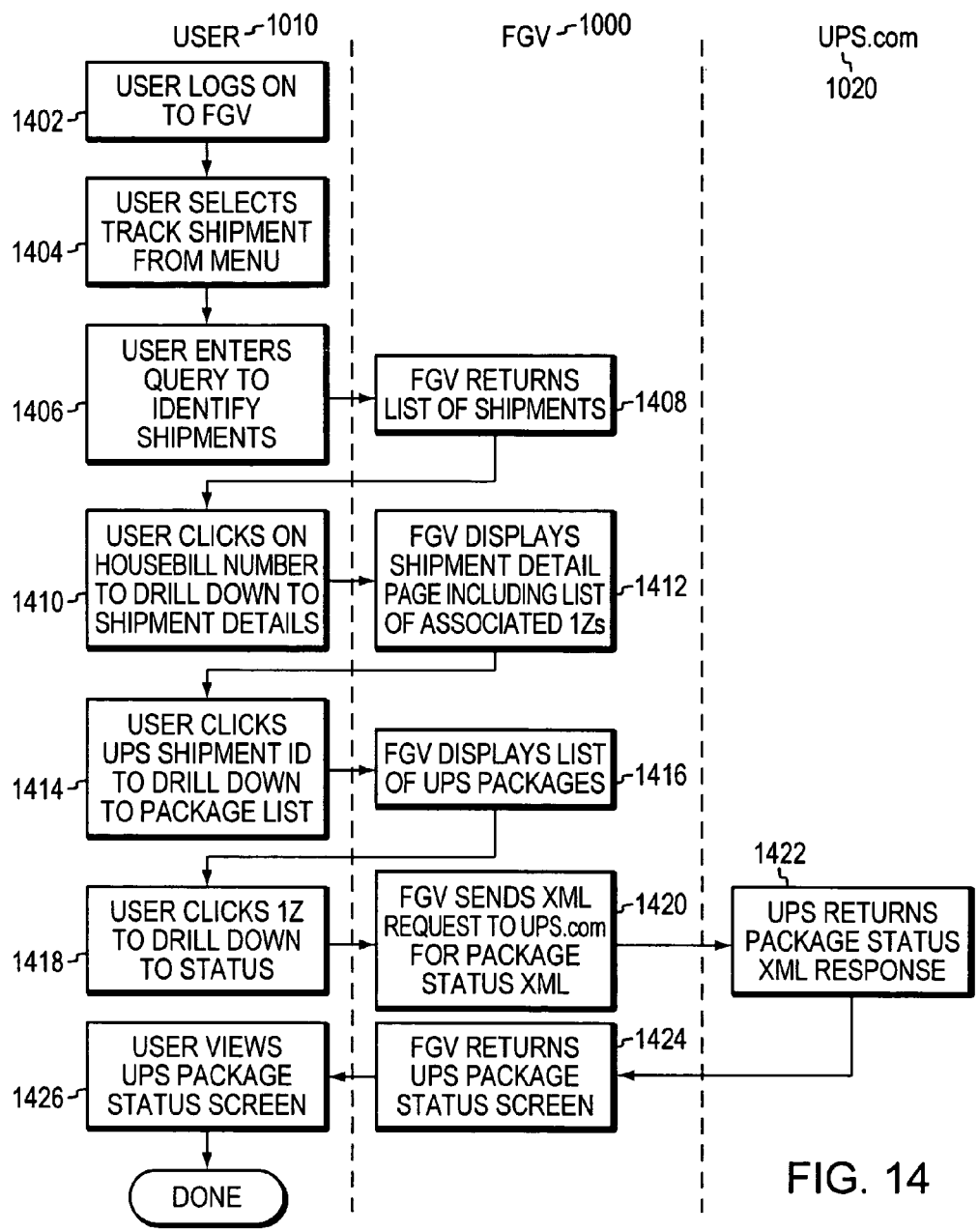
Figure 15:
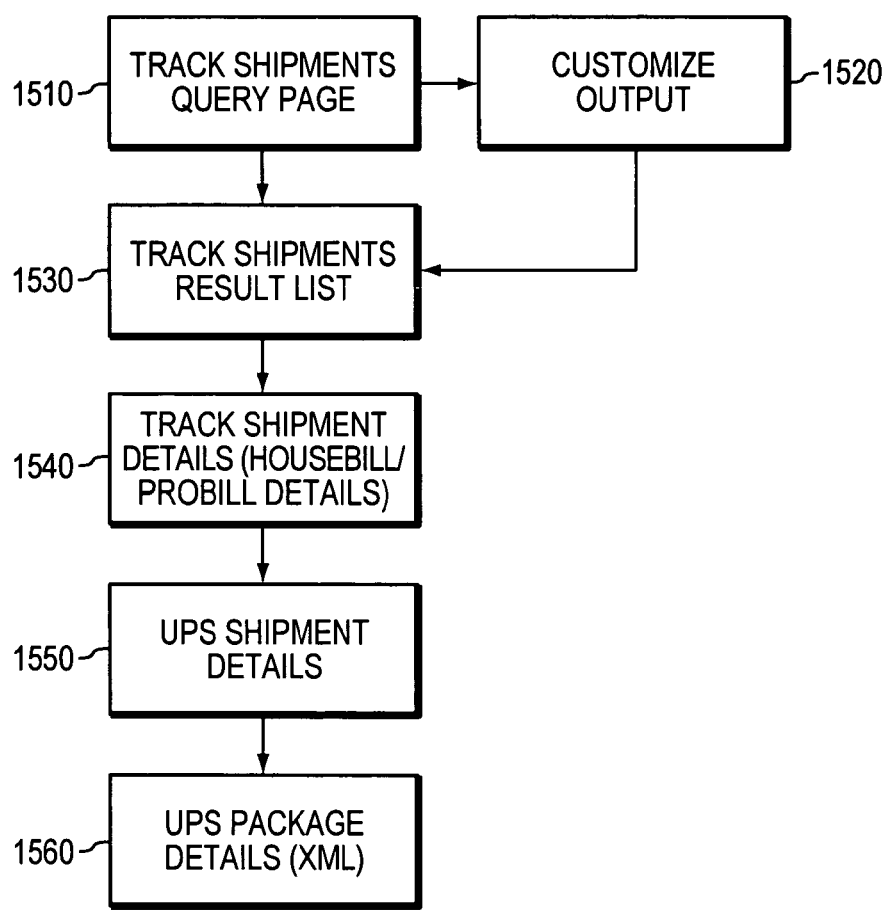

FIG. 3A-B illustrate different shipment levels as applied in the integrated global shipment system of FIG. 1 in accordance with an embodiment of the present invention;

FIGS. 4A-C are exemplary illustrations of different types of shipping labels used in the integrated global shipment system of FIG. 1 in accordance with an embodiment of the present invention;

FIGS. 5A-B are a flow diagram that illustrates how shipments are processed within the integrated global shipment system of FIG. 1 in accordance with an embodiment of the present invention;

FIG. 6 illustrates data outputs regarding shipments processed by the integrated global shipment system of FIG. 1 in accordance with an embodiment of the present invention;

FIG. 7 illustrates the shippers' allocation flexibility provided by the integrated global shipment system of FIG. 1 in accordance with an embodiment of the present invention;

FIGS. 8A-C provide an overview of the end-to-end visibility and various visibility events in the integrated global shipment system of FIG. 1 in accordance with an embodiment of the present invention;

FIG. 9 is a detailed view of the end-to-end visibility and various sub-systems involved in the integrated global shipment system of FIG. 1 in accordance with an embodiment of the present invention;

FIG. 10 is a high-level architecture of the integrated global shipment system of FIG. 1 that provides end-to-end visibility in accordance with an embodiment of the present invention;

FIG. 11 is a detailed system structure of the integrated global shipment system of FIG. 1 that provides end-to-end visibility in accordance with an embodiment of the present invention;

FIG. 12 illustrates exemplary data structures of the integrated global shipment system of FIG. 1 that provides end-to-end visibility in accordance with an embodiment of the present invention;

FIG. 13 illustrates one type of data flow between two sub-systems of the integrated global shipment system in accordance with an embodiment of the present invention;

FIG. 14 is a process flow block diagram that illustrates how the integrated global shipment system of the present invention provides end-to-end visibility of goods in transit;

FIG. 15 is a screen flow illustrating the end-to-end visibility as viewed by a user of the integrated global shipment system in accordance with an embodiment of the present invention;

FIGS. 16-20 are exemplary screen displays as viewed by a user of the integrated global shipment system in accordance with an embodiment of the present invention.

Figure 21A:
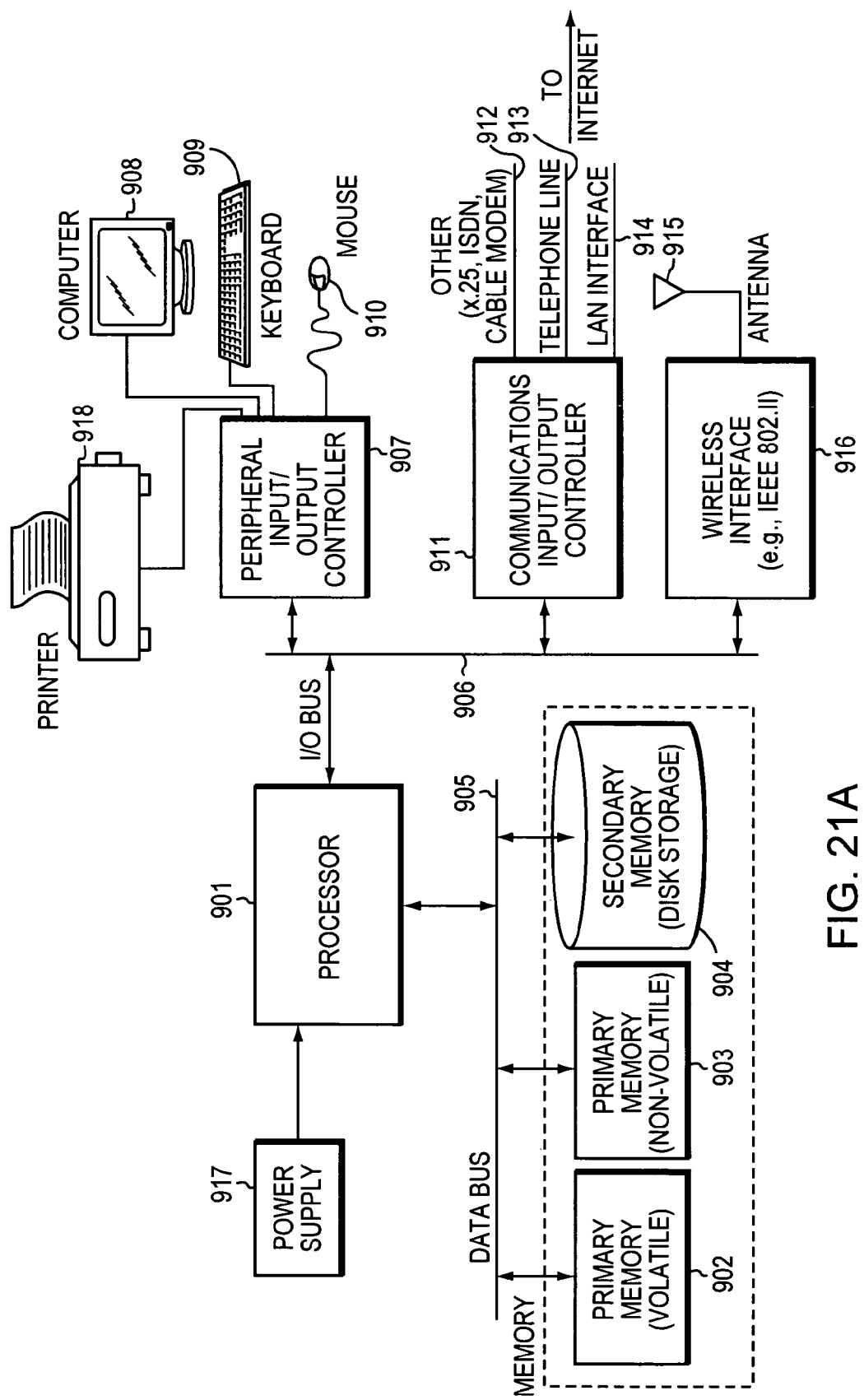
Figure 21B:
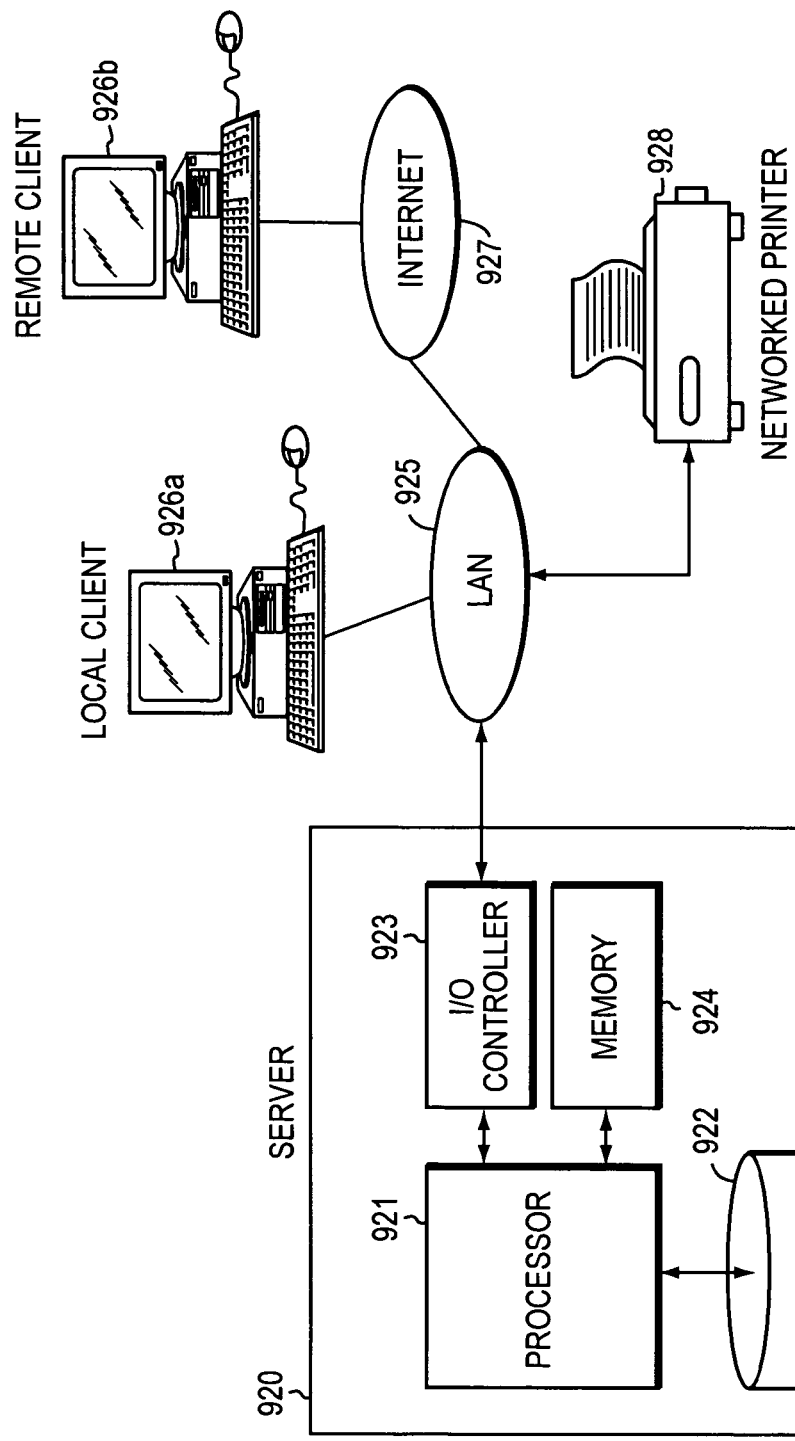

FIGS. 21A-B show the computer hardware architecture that implements the integrated global shipment system of FIG. 1 in accordance with an embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

For the purpose of describing the present invention in detail, certain terms used hereinafter are defined as follows:

"Carrier"—An individual, partnership or corporation engaged in the business of transporting goods or persons.

"Consignee"—The person or organization to whom freight is shipped.

"Shipper"—A company or individual who initiates the transport of goods.

"Shipment"—One or more packages or pieces of freight being transported together.

"Consolidation"—The combining of two or more items or groups of items and transporting them as a single shipment.

"Consolidated Shipment"—The result of consolidation of shipments.

"Child Shipment"—Any shipment that is part of the consolidated shipment.

"LTL (Less-than-Truckload)"—A quantity of freight less than that is required for the application of truckload rate.

"Cross-dock"—A carrier's terminal that is configured to handle the consolidation or transfer of freight. This type of facility provides the ability to unload on one side of the facility and reload to the other side of the facility.

"Container Freight Station (CFS)"—An operation facility where freight shipments are cross-docked and staged between transport legs, sometimes referring to a facility used by ocean carriers to load/unload cargo to and from containers.

"Line haul"—The movement of freight between cities or carrier facilities, excluding pickup and delivery service.

"PRO"—A number issued to each shipment of freight by a carrier and used for tracking or tracing of the shipment to its destination.

Integrated Global Shipment

1. Consolidated Shipment Movement v. Child Shipment Movement

FIG. 1 is a supply chain flow that illustrates how goods move from an origin shipper to a consignee in accordance with one embodiment of the present invention. As seen in FIG. 1, such movement of goods is comprised of two parts: (1) movement of a consolidated freight shipment from an origin location to a destination country and/or region and (2) movement of multiple child shipments within the destination country and/or region till reaching final consignees. In the case of a shipper who is shipping manufactured goods from a factory to respective destination consignees, the process typically begins when a manufacturer receives a purchase order for a certain amount of products or goods. In the illustrated supply chain 10, goods are picked up from an origin shipper 12 by an origin pickup vehicle 14. In a typical scenario, the manufacturer of the goods serves as the origin shipper 12 and the origin pickup vehicle 14 is a freight forwarding service that handles the transportation of the goods from the manufacturing facility to the next stop in the supply chain 10. Depending on the requirements of the purchase order, the freight forwarding service may be selected by the manufacturer or by the entity that is importing the goods. One of ordinary skill will recognize that multiple, sometimes competing freight forwarding service providers may be used to transport the manufactured goods and, in fact, multiple origin shippers 12 may be used to manufacture the goods that are being imported. Thus, while a single origin shipper 12 and a single origin pickup vehicle 14 are illustrated in FIG. 1, the present invention is not limited to this embodiment.

Returning to the supply chain 10 illustrated in FIG. 1, the origin pickup vehicle 14 transports the goods to an origin container freight station (CFS) 16. As described in greater detail below, a number of activities may occur at the origin container freight station 16. One of these activities is to consolidate the goods into a consolidated freight shipment. As one of ordinary skill in the art will recognize, the consolidation process may be a simple consolidation of pre-packaged goods into a container, or may include a pick-and-pack process in which multiple goods are picked, packaged and weighed in accordance with instructions from an importer or a purchase order. In some cases, goods bound for a single consignee arrive at the origin container freight station 16 from multiple origin shippers 12. An aspect of the present invention is to achieve new levels of consolidation efficiencies for these shipments at the point of the origin container freight station 16. Thus, goods received from different origin shippers 12 may be consolidated in a single freight container bound for one or more consignees in the same destination country or region.

Another activity that may occur at the origin container freight station 16 is the labeling of packages or containers containing goods for shipment. If the allocation is known at the point that the goods are at the origin container freight station 16, then the goods may be labeled as part of the consolidation process. In a preferred embodiment, the labeling processes that occur at the origin and destination container freight stations include the affixing of shipping labels used by the package delivery company that transports the packages to the final consignee, such as UPS, Federal Express and United States Postal Services. Preferably, a single package delivery company such as UPS handles the transportation of all packages in the supply chain 10. But one of ordinary skill in the art will recognize that multiple package delivery companies may be used. As a result, the labeling processes can involve the generation and application shipping labels for multiple package carriers. Other types of labels that may be added at this stage include store-ready labels (e.g., stock or pricing information). As described in detail below, an advantage of the present invention is the ability to delay the allocation, that is, the determination of the ultimate destination for the goods, until a later stage in the transportation process and thereby allow greater management of the importers' inventory. Therefore, in still another embodiment of the present invention, some or all of the package labeling processes described above can occur at the sortation hub 32 of the package delivery company.

The next steps illustrated in the supply chain 10 are to process the goods through export customs 18 and to manage an origin drayage 20 of the goods to an ocean vessel 22 docked in a shipyard. As can be readily appreciated by a skilled artisan, alternative transportation means including air or ground transportation can be used to ship goods cross international boundaries. Typically, the step of processing the goods for customs clearance at export customs 18 occurs at the location of the origin container freight station 16. During the consolidation and labeling processes, the paperwork necessary to move the freight container through customs is prepared. But one of ordinary skill will recognize that these steps can occur at separate locations. Once the necessary paperwork has been completed and the freight containers have satisfied the customs requirements, the freight container containing the goods is drayed through the origin drayage 20 to the ocean vessel 22.

When the ocean vessel 22 carrying the freight container reaches the destination port, the original carrier arranges, or, if necessary, a separate carrier is engaged to arrange to have the freight container offloaded to the destination port, processed through import customs 26 and drayed via a destination drayage 24 to a destination container freight station 28.

A deconsolidation process typically occurs at the container freight station 28. In the deconsolidation process, goods that were consolidated into one shipment would then be separated into multiple child shipments, each of which is to be delivered to respective consignee locations. One of ordinary skill in the art will recognize that goods can be allocated in a variety of ways. For example, in the case of small packages, the goods may be transported via line haul 30 to any of several sortation hubs 32 operated by companies such as UPS, Federal Express or the United States Postal Services. When the packages arrive in the sortation hubs 32, they enter into the postal or package delivery networks and are delivered by the transportation company to the consignee 36. The alternatives known in the art include transporting goods by trucks 34 as truckload (TL) or less-than-truckload (LTL) shipments. As will be apparent to one of ordinary skill, these and other transportation alternatives can be combined for transporting goods to a variety of consignee locations. Thus, for example, a given allocation may require that half of the goods received at a destination container freight station 28 be shipped to a UPS sortation hub 32 for delivery to a first consignee, while some other portion of the goods are moving by TL to a second consignee and the balance of the goods are transported to a third consignee via LTL movement.

In a preferred embodiment, a single entity, such as UPS, controls the movement of the goods in each step of the supply chain 10. In some cases, this controlling entity (sometimes referred to herein as the supply chain carrier) itself (or via a subsidiary company) handles the movement of the goods such as, for example, the movement of the goods from the origin shipper 12 to the ocean vessel 22. In other steps in the supply chain 10, the supply chain carrier does not itself move the goods and instead engages a third-party to move the goods, and in so doing retains control of the movement of the goods. Thus, for example, in one embodiment the supply chain carrier is a non-vessel operating carrier and uses a third-party to handle the movement of goods via ocean vessel 22. In such an embodiment, the supply chain carrier will use known tracking systems to obtain periodic updates about the movement and anticipated arrival of the goods at various ports or waypoints in the ocean movement.

Figure 2:
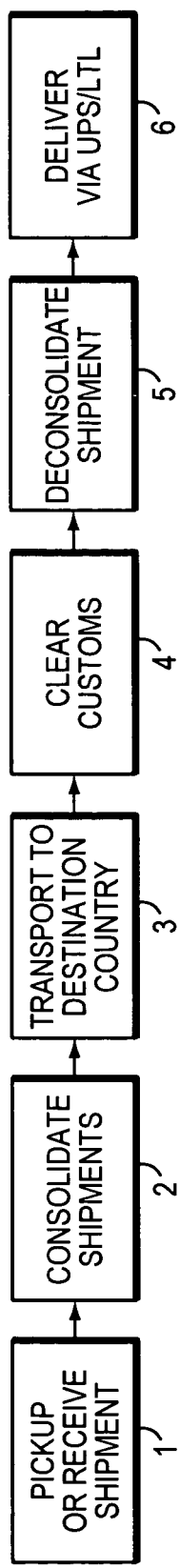
FIG. 2 is a high-level block diagram of a process flow for shipping goods through the integrated global shipment system of FIG. 1 in accordance with an embodiment of the present invention.

To summarize the above-described movement of goods in the supply chain 10, FIG. 2 shows a simplified process flow. In this process flow, a carrier such as UPS would typically carry out or engage other carriers to carry out the following steps in shipping goods into various destination countries or regions:

Step 1: pick up or receives shipments from different shippers;

Step 2: arrange a direct consolidation of different shipments;

Step 3: transport the consolidated shipment across an international boundary to the destination country or region;

Step 4: process the consolidated shipment through the export and import customs to obtain necessary customs clearance paperwork in coordination with Step 3;

Step 5: de-consolidate the consolidated shipment into individual child shipments;

Step 6: put each child shipment into its small package delivery network or LTL shipment network for final deliveries to respective consignee locations.

As one of ordinary skill can appreciate, there are a number of advantages of consolidating individual shipments in international shipments. It significantly reduces the required paperwork and time in customs processing. Furthermore, it lowers individual shipment costs by decreasing brokerage fees, transportation costs, taxes, duties and additional service fees. As a result of the consolidation process, movement of goods in the supply chain 10 is comprised of two levels of movements: a consolidated freight movement that crossed the international boundary and a child movement within the destination country or region. These two movements are described in detail with reference to FIGS. 3A-B.

FIG. 3A shows the relationship between a consolidated freight shipment and child shipments. In general, a consolidated freight shipment (parent shipment) 100 consists of one or many child shipments 110. Such consolidated freight shipment (parent shipment) 100 is represented by a unique shipment identifier, i.e., a consolidated shipment reference number 102, which can be a Bill of Lading (BOL) number or a Pro number as widely used in the transportation industry. By virtue of the consolidated shipment reference number 102, the movement of consolidated shipment 100 can be linked to movements of each of the individual child shipments 110 consolidated therein. Each child shipment 110 can be a shipment comprising multiple small packages 110a or a LTL (Less-than Truckload) shipment 110b or a TL (Truckload) shipment 110c. Each small package 110a is identified by a package tracking number 112 as the lowest unit. The package tracking number 112 may be a lead shipment number (for a defined shipment), or an individual carton number. Each LTL shipment 110b or TL shipment 110c is represented by a Sub-Pro number 114 as the lowest unit. In operation, the consolidated shipment reference number 102 identifies the first movement leg of the consolidated shipment, and is included in all subsequent child transport legs that are each identified by a Sub-Pro number 114 or a package tracking number 112. From customers' perspective, the consolidated shipment reference number 102 and child movement identifiers, namely, Sub-Pro numbers 114 or package tracking Numbers 112, are used in combination for tracking the entire movement of goods, end-to-end.

To further illustrate the relationship between a consolidated freight shipment (parent shipment) 100 and multiple child shipments 110, FIG. 3B provides a specific example. In this example, a freight order is identified by the consolidated shipment reference number 102, i.e., a Pro number, that will be used as referring to the entire consolidated shipment movement. The LTL/TL child shipments are represented by Sub-Pro numbers 114 that associate the LTL/TL child shipment movement to a specific receiver. Each small package is represented by a package Tracking Number 112. As illustrated in FIG. 3B, the origin of the consolidated movement is Canada, and the destination is the U.S. The destination container freight station (CFS) is located in Buffalo, U.S., and the ultimate US consignees are located respectively in Texas, New York, California and Arizona. The consolidated shipment consists of 32 packages and 3 pallets, and more specifically, the consolidated shipment movement is made up of the following child shipment movements:

Sub-Pro 1 is a LTL child shipment consisting of 10 Pkgs1 Pallet—Buffalo to Texas (Ultimate Consignee)

Sub-Pro 2 is a TL child shipment consisting of 20 Pkgs/2 Pallet—Buffalo to New York (Ultimate Consignee)

1 UPS Small Package with a package Tracking Number— Buffalo (UPS Hub) to California (Ultimate Consignee)

1 UPS Small Package with a package Tracking Number— Buffalo (UPS Hub) to Arizona (Ultimate Consignee)

In operation, the shipment identifier (e.g., consolidated shipment reference number 102, Sub-Pro numbers 114, and package tracking numbers 112) can be obtained by scanning a shipping label that, pursuant to the above-described labeling process, is affixed onto a package, a carton or a container, and thus identifies a shipment of goods. FIGS. 4A-C show such exemplary shipping labels. Specifically, FIG. 4A shows an exemplary shipping label for a LTL shipment 110*b* that is printed with a Sub-Pro number 114. FIG. 4B shows an exemplary pallet shipping label printed with a Pro number 102. FIG. 4C shows a small package shipping label printed with a package tracking number 112. As shown in FIGS. 4A-C, a shipping label is typically printed with one of the above-explained the consolidated shipment reference number 102, a Sub-Pro number 114, or a package Tracking Number 112. These numbers are usually printed in both a machine-readable code for scanning purposes and a human-readable text format.

Relating back to FIG. 2, the Step 2 of consolidation is further illustrated in FIGS. 5A-B that show a process flow 500 of an application for consolidating individual child shipments (LTL/TL shipments and/or small packages). The process 500 starts with Step 501 when shippers request shipment of goods from a carrier such as UPS. Step 501 requires a shipper to supply a shipping account number established with the carrier. Typically, a carrier establishes and maintains a client database that includes account information of various shippers, especially its long-term customers with large volume shipments and/or revolving needs for shipment of goods. By means of such established accounts, the carrier can save a lot of time in collecting customer information and shorten the processes of receiving and authorizing shipment requests, preparing and arranging for shipments and generating shipping bills for customers. Especially, in accordance with one embodiment of the present invention, the use of known customer information can be maximized in the consolidated shipping process. For each established customer, the carrier can consolidate multiple bills including brokerage, transportation, duties, taxes, and additional services. As can be appreciated by one of ordinary skill, a consolidated bill or invoice would enhance the financial visibility and management of a shipper-customer, particularly in the field of shipping cost control.

Turning back to FIG. 5A, after a shipper's account information is verified in Step 501, a shipper is provided with an option whether to consolidate its shipments with other individual shipments in Step 502. Sometimes a shipper may choose not to consolidate its shipments with other shipments. This typically occurs to shippers whose daily shipping volumes are so huge as to render consolidation unnecessary or impractical. If consolidation is not requested in Step 502, then the received shipments will be processed separately as shown in Step 503. Otherwise, the received shipments will be labeled for consolidation in Step 504. Depending upon the destination country or region of received shipments, a particular consolidated shipment reference number 102 will be located from a database 550 that stores shipping data associated with a number of consolidated shipments. Such shipping data includes, but not limited to, a particular shipping lane (origin country—destination country), a particular transportation means (air, ocean, ground) and a particular shipment date. In the database 550, each consolidated shipment is identified by a consolidated shipment reference number 102, and in particular, one consolidated shipment that is identified by the located particular shipment reference number 102 will be shipped to the same destination country or region of received shipments. With this particular shipment reference number 102, Steps 506-509 will process data of each received child shipment to be consolidated.

In processing a particular child shipment, Step 506 first determines whether such child shipment is a LTL child shipment. If so, Step 507 processes data of the particular child shipment under LTL-shipment-specific rules. For example, Step 507 first identifies a Sub-Pro number 114 as identifier of the LTL shipment, establishes a reference record including both the Sub-Pro number 114 and the particular consolidated shipment reference number 102, and save the reference record into the database 550 that stores the data of the particular child shipment and the data of the consolidated shipment. If the particular child shipment is not a LTL shipment, Step 508 applies small-package-specific rules to that child shipment. More specifically, each package of multiple packages within the child shipment is identified by a package tracking number 112. Thus, Step 508 obtains each package tracking number 112 and associates it with the particular consolidated shipment reference number 102 by establishing data records including each pair of a package tracking number 112 and the particular consolidated shipment reference number 102. Such data records will be stored into the above-mentioned database 550 as well. Step 509 queries whether there are additional child shipments to be consolidated, and if so, it repeats the process from Step 506 to Step 507 or 508. In Step 510, determination is made whether there are any additional shipments to process until the entire daily volume of shipments are exhausted at the end of a day in Step 511.

After all shipments are processed at the end of a day in Step 511, some necessary actions will be taken as shown in FIG. 5B, such as generating shipment outputs and, based upon the shipment outputs, updating relevant information stored in various system databases in accordance with one embodiment of the present invention. Corresponding to the different processing steps as applied to different types of shipments in FIG. 5B, the generated shipment outputs include outputs for consolidated shipments as well as outputs for non-consolidated shipments. Thus, at Step 512, the process first determines whether an output for the consolidated shipment is required. For non-consolidated shipment outputs, Step 513 generates a small package manifest. Based on this small package manifest, Step 514 will update a carrier's small package shipment management system. Meanwhile, outputs for the consolidated shipment can be generated as at Step 515. Such outputs for the consolidated shipment will be described in detail below with reference to FIG. 6. Step 516 will update a carrier's backend shipping system for managing consolidated shipments. Because each consolidated shipment can comprise multiple child shipments including LTL/TL shipments or small packages, further steps are taken to update the carrier's LTL shipment management system and small package management system respectively. These steps include: Step 517 that determines whether an individual child shipment is a LTL shipment, and if so, Step 518 that updates the LTL shipment management system, otherwise, Step 519 that determines whether the child shipment is a shipment comprising multiple packages, and if so, Step 520 that updates the small package management system accordingly, which more specifically refers to a temporary PLD (Package Level Detail) repository as will be described in detail below with reference to FIG. 9.

Referring to FIG. 6, shipping system outputs will be described. Again, what shipment outputs should be generated depends on the determination in Step 601, i.e., whether the shipment for which output is requested is a consolidated shipment. If so, Step 602 will first process the consolidated shipment records stored in a database to obtain a consolidated manifest or House Bill of Lading (HBOL) as shown in Step 603. An electronic form of the consolidated manifest or a House Bill of Lading is generated in Step 604. Then an electronic form of the invoice regarding the consolidated shipment movement is generated in Step 605. Such electronic manifest/HBOL and invoice will be emailed to the original shippers for their reference, or optionally to a customs agent, as shown in Step 606. Because the shipment reference number 102 is part of the consolidated shipment records, each individual shipper will be provided with the consolidated shipment reference number 102 that enables them to track their own individual shipments that have been combined into this consolidated shipment. In the prior art, a shipper would likely lose track of his shipment of packages during the movement of consolidated shipments across an international boundary. This is because the first-level of movement is represented by consolidated shipments or parent shipments and thus shippers' child shipments that are merged into a consolidated shipment can no longer be tracked by what shippers are provided with, namely, child shipment reference numbers (Sub-Pro numbers 114 or package numbers 112). In accordance with the present invention, however, shippers are provided with a consolidated shipment reference number 102 to track a particular consolidated shipment in the first-level movement. Alternatively, given the association between such consolidated shipment reference number 102 and individual child shipment reference numbers (Sub-Pro numbers 114 or package numbers 112) stored in a system database, shippers can also use their child shipment reference numbers to obtain consolidated shipment reference number 102 for tracking their own child shipments.

When consolidated shipments reach the destination country, the deconsolidation process in Step 5 as seen in FIG. 2 will be performed. As a result of the deconsolidating process, each child shipment can be identified and thus further shipment outputs can be generated for each child shipment. For example, as the items of the consolidated shipment are deconsolidated, the codes on their labels can be scanned and decoded so that the resulting sub-pro numbers or package tracking numbers are identified and transmitted to a system database as described in detail below. As seen in FIG. 6, Step 607 processes data of a LTL child shipment and Step 608 generates an electronic document containing LTL PLD. Step 609 represents the time at which such LTL child shipment enters into the carrier's end-delivery network, which means it will be delivered to the ultimate consignee in the destination country. The relevant entities (shipper, consignee) will be notified of the arrival of such shipment via emails, faxes, phone calls, or any other equivalent means as shown in Step 610. By analogy, a shipment comprising multiple packages will be processed in Step 611 to generate an electronic small package PLD document in Step 612. After the Step 609 as explained above, the relevant entities (shipper, consignees) will be notified of the arrival of packages via emails, faxes, phone calls, or in any other equivalent manner as shown in Step 613.

2. Virtual Inventory: Distribution Center (DC) Bypass and Allocation Delay

As described in detail below, an advantage of the present invention is the ability to delay the allocation, that is, the determination of the ultimate destination for the goods, until a later stage in the transportation process and thereby allow improved management of the importers' inventory. Sometimes when a manufacturer or supplier receives a purchase order for goods or products, the purchase order may not identify the allocation for the manufactured goods, that is, the manufacturer may not know where the goods will ultimately be shipped. In that case, the ability to delay allocation allows shippers to avoid delaying shipments until being certain about the ultimate consignee locations. Even if the allocation is known initially, destinations may be subject to re-direction depending upon the real-time market demands. For example, a purchase order may be sent to one or more international vendors requesting the production and shipment of an amount of goods to the United States. At the time that the purchase order is sent, the importer does not have to know how it will allocate the goods among its various consignee locations (e.g. retail outlets). Instead, the importer needs only to estimate its anticipated need for the entire region using one of several demand planning systems that are known in the art, and the importer can wait until the goods arrive at the destination container freight station 28, as seen in FIG. 7, before determining how to allocate the goods between the various consignees. This wait may preferably be a short time (e.g., 4-5 days) prior to, or even immediately after the goods arrive at the destination container freight station. In some cases, especially when the goods are moved by ocean vessel, this means that importers may have an additional two or three weeks before they have to determine the allocation. As will be apparent to one of ordinary skill in the art, the ability to delay the allocation gives the importer greater ability to respond to changing supply and demand conditions and offers a degree of flexibility not present in supply chain systems that are known in the art.

FIG. 7 illustrates the advantage of providing such flexibility in terms of specific timelines. For instance, if the labeling and allocation activities did not occur at the origin container freight station 16, these activities are performed at the destination container freight station 28. That gives a manufacturer or a supplier a grace period of typically at least 18 days to delay final determination how to distribute goods. As can be readily appreciated by a person of ordinary skill, such grace period may vary in a wide range, depending on different origins and destinations.

In addition, another advantage of the present invention is to provide an integrated shipment solution that allows shippers (i.e., goods suppliers, manufacturers, vendors, individual customers, etc.) to bypass distribution centers by shipping packages or goods across borders and directly to final consignees (i.e., retail stores, individual customers, etc.) within the destination country. As seen in FIG. 7, there is no need for suppliers or manufacturers to maintain distribution centers in the supply chain 10 because allocation of goods can be determined and timely updated at any point from the origin container freight station 16 to the destination container freight station 28. Both stations are a carrier's operating facilities. In other words, by using the transportation containers (e.g., ocean vessels, ground trucks) as virtual inventory warehouses, the present invention allows suppliers to bypass distribution centers used to be necessary for storing goods awaiting final allocation in the supply chain.

Enhanced End-to-End Visibility

1. Overview of the End-to-End Visibility Concept

Another aspect of a preferred embodiment of the supply chain system 10 of the present invention is an ability to deliver end-to-end visibility. At present, the supply chains that are known in the art are dominated by small freight forwarding companies that have limited freight tracking capabilities and, typically, the freight tracking that is presently available is most often reliant on manual information transmitted via telephone, facsimile and paper documents. And whatever limited tracking is available on the freight or consolidated shipment movement leg of the supply chain ends when the shipment leaves the destination container freight facility 28 and enters the end-delivery systems (or child shipment movement leg). In other words, prior attempts to provide end-to-end visibility for shipping customers have been "piecemeal" combinations of limited tracking information without an automated integrated interface that provides all tracking information. A benefit of an embodiment of the present invention is the ability to track the shipment through both the consolidated shipment movement leg and child shipment movement leg(s), and, moreover, to provide this end-to-end tracking via a single interface.

As illustrated in FIGS. 8A-C, the movement of goods from the origin to the destination country or region is governed by a freight tracking system (including a system for tracking consolidated shipments), and the movement within the destination country or region till each respective consignee location is governed by an end-delivery system (including a system for tracking child shipments). A link between the freight tracking system and the end-delivery system preferably occurs at the point when the end-delivery package labels are added to the packages or goods, which occurs after the allocation is determined either at the origin or destination container freight stations. As part of the integration of the various tracking systems, an end-delivery tracking number (e.g., Sub-Pro number 114 or package tracking number 112) is linked to a freight tracking reference number (e.g., consolidated shipment reference number 102) such as a house bill of lading or a pro bill. Thus, when a user accesses the freight tracking database with a freight tracking reference number, the freight tracking system uses this link to access the end-delivery tracking numbers that are associated with the shipment being tracked. In the case of small goods, multiple end-delivery tracking numbers, such as the package tracking number used by UPS to track packages in its network, are typically associated with a single freight tracking reference number. But one of ordinary skill will recognize that the supply chain system 10 described herein is not limited to small package movement and in the case of larger goods, such as white goods, a single end-delivery tracking number may be associated with a freight tracking reference number.

As shown in FIGS. 8A-C, this type of integration of the freight tracking and end-delivery tracking systems provides the user with end-to-end visibility through both a consolidated freight movement leg and a child shipment leg of the supply chain 10. Thus, when a shipment is in transit from the origin shipper 12 to the destination container freight station 28, i.e., the consolidated freight movement leg, the freight tracking system provides the tracking data for the consolidated containers. When the shipment reaches the destination container freight station 28 and the packages are deconsolidated, the individual packages leave the control of the freight companies, and the final movement from the destination container freight station 28 to the ultimate consignee(s), i.e., the child shipment leg, is tracked by the end-delivery system (or systems).

In an alternative embodiment, the end-to-end visibility is provided to the user through recording and reporting various visibility events. These visibility events correspond to various occurrences during the movement of goods in the consolidated shipment as well as child shipments. In other words, the visibility events altogether reflect the end-to-end visibility in terms of a shipment timeline. In the case of a shipper who is shipping manufactured goods from a factory to destination consignees (e.g., retail stores), there are a number of consolidated shipment events 710, including receiving purchaser order information of goods, requesting for a pickup or notifying of a drop-off of shipments of goods, arrival of shipment of goods at the origin container freight station (CFS) 16, departure of shipment of goods from the origin container freight station (CFS) 16, export clearance of shipment of goods, departure of shipment of goods from the origin country, arrival of shipment of goods in the destination country, import clearance of shipment of goods, and arrival of shipment of goods at the destination container freight station (CFS) 28. The child shipment events 720 include uploading Package Level Data (PLD) or LTL shipment data at the origin container freight station (CFS) 16 and the destination container freight station (CFS) 28 respectively, LTL shipment pickup, tender of goods to end-delivery carriers such as UPS, and tracking movement of shipment within an end-delivery network. In a preferred embodiment, the present invention provides an ability to facilitate return of ordered goods or products from a consignee in the destination country to the origin country. The resulting child shipment return events 730 may include, but not limited to, receiving returns for consolidation, receiving returns for deposition, notification of returns, and awaiting disposition. There are also exception events 740 that govern exceptional instances during the movement of goods, such as data file exception (e.g. data file not received), pickup exception, change in estimated date of departure, change in estimated data of arrival, general exceptions (e.g., damages, fallout, hold, delay), hold at export customs or import customs. All these exception events 740 can occur during either consolidated shipment movement, or child shipment movement or both movements, and need to be notified to shippers in a timely manner. Thus, shipment notifications 750 include consolidated shipment exception notifications, LTL shipment exception notifications and small package exception notifications. In addition, the shipment notifications 750 include consolidated shipment ship notification, tender to LTL shipment notification, tender to a third party for delivery notification, and tender to end-delivery of small packages notification. From the standpoint of information management, each visibility triggers a corresponding data update and/or data report.

In a preferred embodiment, the tracking of the shipment through the freight movement leg and the child shipment leg occurs via a single web browser interface. A number of software applications are known in the art for tracking shipments through the freight movement leg of the supply chain, and one of these applications is known as Flex Global View (FGV). As described in detail with reference to FIGS. 9-11, in a preferred embodiment, the FGV interface is adapted to allow users to drill down and obtain child shipment data, which allows the user to track the various packages in a shipment through the child shipment leg of the supply chain.

In a preferred embodiment, the end-delivery tracking system communicates via a network, such as the Internet, to update the freight tracking system with updates about the movement of child shipments in the end-delivery system or systems. In a preferred embodiment, these updates occur at predetermined intervals, such as, for example, once an hour.

In an alternative embodiment, a link is established on a transaction-by-transaction basis between the freight tracking system and the end-delivery tracking system to obtain a status update about one or more of the child shipments whenever requested by a user. Or, in still another alternative embodiment, the freight tracking system is updated on a predetermined interval, but the user has the option of requesting an immediate update for a selected package or child shipment. This data loading process will be described in detail below with reference to FIG. 13.

The diagram in FIG. 9 illustrates an implementation of an integrated system 800 for providing end-to-end visibility of movement of goods in international shipments. As aforementioned, such movement is comprised of two levels: movement of a consolidated freight shipment and movement of individual child shipments. Typically, separate systems are employed to provide visibility into different movements. For example, users can access a freight movement visibility system that allows user to enter a freight tracking number and view generic tracking events and generic data elements specific to the tracking number that was entered. This system does not provide PLD information of each individual package or LTL shipment within a child shipment. In addition, when a consolidated freight shipment is de-consolidated, the tracking events of each individual child shipments, especially each small package, are invisible to users in this system. The child shipments may be performed by different carriers and as a result, users have to access different systems for viewing the movement of child shipments. The present invention provides an integrated system 800 combining all these existing or non-existing systems so that users have a single interface from which to view the full life cycle of their shipments, including detailed tracking events and data elements, from a shipping origin to a destination country and to the ultimate consignees within the destination country.

As seen in FIG. 9, to implement the end-to-end visibility concept, the integrated system 800 requires operations and communications of a number of sub-systems. These sub-systems include, but not limited to, a visibility interface system 810, a client shipping system 840, a small package visibility system 850, a warehouse management system 860, a LTL shipment visibility system 870, a transportation management system 880, a customs management system 890. While each of the above-listed systems may include one or more databases for storing data, as can be readily appreciated by a person of ordinary skill, the integrated system 800 utilizes additional databases for facilitating transfer and frequent use of certain types of data. Such databases include a PLD database 830, a PLD extract database 820 and a customer shipment detail database 900.

Functionalities of each above-identified system components and their contributions to the operation of the integrated system 800 are described in the following processes:

Process 1—Creating Shipping labels

Depending on the country of origin, a shipper may have access to use the client shipping system 840 to produce a label. Such client shipping system 840 can be customized by the carrier and, as part of a programmable service application, integrated into a shipper's internal system. Alternatively, the client shipping system 840 can be hosted in an ASP (Application Service Provider) environment, and thus can be accessible to any users over a communications network, preferably the Internet. For any shipments that are intended to be consolidated into a consolidated shipment, the client shipping system 840 will assign to the corresponding shipment data records stored in the database 830 an additional reference field that will be used to store the House Bill of Lading or the master PRO number. Meanwhile, an indication flag is set in the database 830 for the data records of each small package within a received shipment in the small package visibility system 850. At the end of day processing, the small package visibility system 850 loads package information to the PLD database 830.

Process 2—Downloading Small Package data from the PLD database 830

On a regular basis, the package information loaded into the PLD database 830 is parsed and a subset of this data is extracted and made available to the visibility tool(s). As seen in FIG. 9, this subset of package data is stored in a PLD extract database 820. This process creates the link between the package identifiers, i.e., package tracking numbers 112, and the consolidated freight shipment identifier, i.e., consolidated shipment reference number 102, which is also stored in the database 820 as described below.

Process 3—Warehousing of Shipments

Typically, the CFS/Cross Dock locations (See 16, 28 in FIG. 1) will use a warehouse management system 860 (e.g. Exceed, PKMS MEPAW, etc). An interface between the warehouse management system 860 and the visibility interface system 810 (Flex Global View) has been deployed. This will allow for visibility events to be captured for inbound cross dock, outbound cross dock, and returns processing for shipments. The warehouse management system 860 has the capability to print packing lists. As can be readily appreciated to one of ordinary skill, the warehouse management system 860 also allows for shipment records to be loaded to the client shipping system 840 for labeling of the individual packages as defined in Process 1.

Process 4—Customs Brokerage

Shippers may submit a data file 900 with the shipment details for customs brokerage. A shipment identifier (HBL or PRO number) is supplied with the data file 900 to identify the shipment when it arrives at the border. This data file 900 also includes type of materials, destination, harmonized codes, and weight of shipment. This file 900 is submitted to the customs management system 890, which can be any off the shelf system (e.g., VASTERA, Theta, or Main brokerage system). The customs management system 890 uses the API interface to collect brokerage events from the customs. In the meantime, customs uses the file 900 to clear the cargo upon entry into the destination country.

Process 5—Transportation Management (TM)

The origin CFS/Cross Dock locations 16 have access to a transportation management system 880. This system is used to collect and track the movement of a shipment after it leaves the origin CFS/Cross Dock location 16. The events captured in the transportation management system 880 are loaded into the visibility interface system 810 (Flex Global View). The transportation management system 880 can be GBS-TM that is typically used in ocean and air transportation, or Alpha-Truck that is typical of ground transportation. When the customer is ready to have a shipment transported, it either uses the client shipping system 840 or a web portal connected to the transportation management system 880 to prepare the shipment. A shipment identifier (HBL or PRO number) is assigned to the shipment and tracked in the transportation management system 880. When the shipment arrives at a CFS/Cross Dock location, the arrival event is manually entered into the transportation management system 880. When a shipment is ready to leave the destination CFS/Cross Dock for either Small package or LTL/FTL distribution, the departure (tendered to) event is manually entered into the transportation management system 880.

Process 6—Visibility

All CFS/Cross Dock locations use the visibility interface system 810 (such as Flex Global View) as the visibility tool. The visibility interface system 810 allows a user to view visibility events about a shipment or part of a shipment in one of the following methods:

a. All Shipments for a Customer

A user is able to query for all shipments within a specified date range by entering their customer shipper number and the desired date range. The query will return a list of all shipments for the customer that were picked up between the specified date ranges. The user will then be able to select a specific shipment to view visibility events related to that shipment.

b. Entire Shipment Query

A user is able to query for an entire shipment by entering a PRO number 102 or a House Bill of Lading number 102. The query will return the shipment level summary events. The events will stop at the identification of any split in the shipment. This normally occurs when the shipment arrives at and then departs from the destination CFS/Cross Dock 28. The user will be able to select any of the splits of the original shipment to drill down to the next level when package detail data is uploaded at the destination CFS/Cross Dock 28.

c. Shipment Split Query

A user is able to query for a specific child shipment of the original consolidated shipment. The user will enter a Sub-Pro number 114. The search will return the child shipment level information. These events will show all movements from the time the original consolidated shipment was split until the child shipment is delivered, or is again split into smaller shipments. If the split shipment is delivered as comprising only small packages, the user will be able to select any of the package tracking numbers 112 to drill down to the next level. This functions the same as the individual package tracking.

d. Individual Package Search

A user is able to query for a specific package or a group of packages being shipped to the same location. This query can only be performed for small package shipments. The user will enter either the package tracking number 112 of a specific package or the reference field identifier, such as store number, purchase order number, or HBL number. The query will pull data from the small package visibility system 850 for matching records for the package or reference field supplied.

2. Specific Implementation of the End-to-End Visibility Concept

With reference to FIGS. 10-21A-B, a specific web-based application system providing end-to-end visibility will be described.

a. System Architecture

FIG. 10 shows a high-level diagram of the architecture of the visibility interface system 810 in accordance with one embodiment of the present invention. The architecture is comprised of three layers: a client interface 1010, a middle-ware application 1000 and a backend system server 1020. Typically, the client interface 1010 comprises a web browser 1012 as a user-friendly interface. The middle-ware application 1000 comprises one or more web servers 1002 that process user requests received from the web browser 1012 and one or more application servers 1004 that execute specific programmable instructions in response to receiving data processed by the web servers 1002. To make data easily accessible to the application servers 1004, the middle-ware application 1000 preferably comprises a database for direct data access and retrieval. In FIG. 10, the database is represented by the PLD extract database 820 as explained above. The backend system server 1020 refers to all of the backend systems that communicate with and support the middle-ware application 1000. As can be appreciated by one of ordinary skill, this backend system server 1020 can comprise a number of servers and databases. For illustration purposes, FIG. 10 shows that in the level of the backend system server 1020 there are at least a central server 1022 and a database, i.e., the PLD database 830.

FIG. 11 provides a detailed view of the system architecture presented in FIG. 10 and how data flows between different servers and databases of the visibility interface system 810 in operation. The client interface 1010 (i.e., the web browser 1012) receives user queries which are to be communicated to at least one of the web servers 1002. The web server 1002 will process the user queries to generate query data that triggers execution of certain programmable instructions by at least one of the application servers 1004. In executing the programmable instructions, the application server 1004 will determine from which database to retrieve response data. As seen in FIG. 11, the application server 1004 can access the PLD extract database 820 that stores a subset of package data. Such subset of package data is updated by loading information automatically from the PLD database 830 on an hourly basis or daily basis. In a preferred embodiment, such data loading can be performed by a FTP server 1028 that comprises a host server 1024 having access to the PLD database 830 and communicating with an agent application server 1026. The agent application server 1026 transfers package data received from the host sever 1024 to a database server 1006 that resides in the middle-ware application 1000. Then, the database server 1006 executes a load-script application 1008 for storing loaded package data into the PLD extract database 820. This loading process is further illustrated in FIG. 13 as described below. If the PLD extract database 820 does not contain the requested package data, the application server 1004 will generate a data request, which is preferably in the format of a XML document, to the backend system server 1020. The XML Tools 1021 installed in the backend system server 1020 interprets the XML data request so that the requested package data will be retrieved from the PLD database 830 and transferred to the application server 1004.

b. Hardware Requirements

Turning to FIG. 21A, one embodiment of a computer is illustrated that can be used to practice aspects of the present invention. In FIG. 21A, a processor 901, such as a microprocessor, is used to execute software instructions for carrying out the defined steps. The processor receives power from a power supply 917 that also provide power to the other components as necessary. The processor 901 communicates using a data bus 905 that is typically 16 or 32 bits wide (e.g., in parallel). The data bus 905 is used to convey data and program instructions, typically, between the processor and memory. In the present embodiment, memory can be considered primary memory 902 that is RAM or other forms which retain the contents only during operation, or it may be non-volatile 903, such as ROM, EPROM, EEPROM, FLASH, or other types of memory that retain the memory contents at all times. The memory could also be secondary memory 904, such as disk storage, that stores large amount of data. In some embodiments, the disk storage may communicate with the processor using an I/O bus 906 instead or a dedicated bus (not shown). The secondary memory may be a floppy disk, hard disk, compact disk, DVD, or any other type of mass storage type known to those skilled in the computer arts.

The processor 901 also communicates with various peripherals or external devices using an I/O bus 906. In the present embodiment, a peripheral I/O controller 907 is used to provide standard interfaces, such as RS-232, RS422, DIN, USB, or other interfaces as appropriate to interface various input/ output devices. Typical input/output devices include local printers 918, a monitor 908, a keyboard 909, and a mouse 910 or other typical pointing devices (e.g., rollerball, trackpad, joystick, etc.).

The processor 901 typically also communicates using a communications I/O controller 911 with external communication networks, and may use a variety of interfaces such as data communication oriented protocols 912 such as X.25, ISDN, DSL, cable modems, etc. The communications controller 911 may also incorporate a modem (not shown) for interfacing and communicating with a standard telephone line 913. Finally, the communications I/O controller 911 may incorporate an Ethernet interface 914 for communicating over a LAN. Any of these interfaces may be used to access the Internet, intranets, LANs, or other data communication facilitites.

Finally, the processor 901 may communicate with a wireless interface 916 that is operatively connected to an antenna 915 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

An alternative embodiment of a processing system than may be used is shown in FIG. 21B. In this embodiment, a distributed communication and processing architecture is shown involving a server 920 communicating with either a local client computer 926a or a remote client computer 926b. The server 920 typically comprises a processor 921 that communicates with a database 922, which can be viewed as a form of secondary memory, as well as primary memory 924. The processor also communicates with external devices using an I/O controller 923 that typically interfaces with a LAN 925. The LAN may provide local connectivity to a networked printer 928 and the local client computer 926a. These may be located in the same facility as the server, though not necessarily in the same room. Communication with remote devices typically is accomplished by routing data from the LAN 925 over a communications facility to the Internet 927. A remote client computer 926b may execute a web browser, so that the remote client 926b may interact with the server as required by transmitted data through the Internet 927, over the LAN 925, and to the server 920.

Those skilled in the art of data networking will realize that many other alternatives and architectures are possible and can be used to practice the principles of the present invention. The embodiments illustrated in FIGS. 21A and 21B can be modified in different ways and be within the scope of the present invention as claimed.

c. Data Structures

As can be appreciated by a person of ordinary skill, the visibility interface system 810 according to one embodiment of the present invention involves all kinds of data, such as the above-mentioned PLD data. To illustrate the data structures 1200 of the system 810, FIG. 12 provides a set of data tables containing various data elements. As shown in FIG. 12, each data record in the table of Package 1210 is represented by a tracking number 1211, referenced by a shipment number 1231, and described by the data fields of a description 1212, a weight 1213 and a COD amount 1214. Each data record in the table of Shipment 1230 is identified by the shipment number 1231, and comprises data fields: Pickup_Date 1232, Service_Level 1241, Consignee_Name 1251, Consignee_Attention Name 1252 and Shipper_Name 1261. The table of Service_Level 1240 includes different transportation means such as air, ocean, ground, etc. The Consignee table 1250, identified by Consignee_Name 1251 and Consignee_Attention Name 1252, comprises data profiles of different consignees. A consignee data profile includes information such as Consignee_Address 1253, Consignee_City 1254, Consignee_State 1255, Consignee_Country 1256 and Consignee_Postal_Code 1257. Similarly, the Shipper table 1260, identified by Shipper_Name 1261, comprises data profiles of different shippers. A shipper data profile includes information such as Shipper_Address 1262, Shipper_City 1263, Shipper_State 1264, Shipper_Country 1265 and Shipper_Postal_Code 1266. The Package_Reference table 1220 reflects the links between packages and shipments. Besides the data fields of tracking number 1211 and shipment number 1231, a data record of the Package_Reference table 1220 also includes a Reference_Sequence field 1221 and a Reference field 1222.

The relations between these data tables are explained below:

R1: Package 1210 v. Shipment 1230

Because a shipment may comprise multiple packages, the relation between Shipment 1230 and Package 1210 is 1:N.

R2: Package 1210 v. Package_Reference 1220

To facilitate information retrieval, the relations between Shipment 1230 and Package 1210 are stored in a separate table, namely, Package_Reference 1220. This table is identified by a combination of the tracking number 1211 and shipment number 1231. For each package, it can be associated with one child shipment or one consolidated freight shipment. Therefore, the relation between Package 1210 and Package_Reference 1220 is 1:N.

R3: Shipment 1230 v. Service-Level 1240

Each shipment may be transported via more than one transportation means. For example, a consolidated shipment can be shipped across the ocean before it is deconsolidated and the enclosed child shipments enter into the ground transportation network. Thus, the relation between Shipment 1230 and Service-Level 1240 is N:N.

R4: Shipment 1230 v. Consignee 1250

A shipment can comprise multiple packages, each intended to be delivered to a different consignee. In turn, a consignee may receive more than one shipment. As a result, the relation between Shipment 1230 and Consignee 1250 is N:N.

R5: Shipment 1230 v. Shipper 1260

A shipment can comprise multiple packages, each received from a different shipper. In turn, a shipper may request for more than one shipment. Thus, the relation between Shipment 1230 and Shipper 1260 is N:N.

d. Process Flow

FIG. 14 is a process flow block diagram that illustrates how the present invention provides end-to-end visibility of the movement of the goods from the origin shipper 12 to consignee 36 as illustrated in the supply chain 10. Again, in one embodiment, each step in the movement of the goods is preferably controlled by a single entity referred to herein as a supply chain carrier. While the present invention is not limited to this embodiment, an advantage of having one supply chain carrier, such as UPS, is the presentation of an end-to-end delivery solution with a one point of contact for visibility and, preferably, a consolidated invoice (as produced by Step 605 in FIG. 5B) that has one delivery price (in one currency) that reflects the accumulated cost of each stage of the delivery process (even if several of the movements in the delivery process were performed by third-party entities and even if several of these entities required payment in one or more different currencies). Thus, an aspect of the present invention is the combination of freight movement with end delivery processes and the control and management of these systems by a single supply chain carrier.

With reference to FIG. 14, the process flow is described involving a user using the client interface 1010, middle-ware application 1000 (represented in the figure as FGV) and back-end system server 1020 (represented in the figure as UPS.com).

The user logs on to the freight tracking system in Step 1402 and selects Track Shipment from a menu of options in Step 1404. At Step 1406, the user enters an identifier that is used to query specific shipment information stored in a database accessible to the middle-ware application 1000. The identifier is preferably a date or some other type of reference information. A number of data filters can be used in this step and will be described below with reference to the exemplary screen displays in FIGS. 16-20.

At Step 1408, the middle-ware application 1000 returns a list of shipments that match the query criteria. The list of shipments may take the form of a list of House Bills of Lading, a list of Pro bills, or some other reference identifier that is known or commonly-used in the freight forwarding industry.

At Step 1410, the user clicks on one of elements in the list of shipments (e.g., clicks on one of the listed house bills of lading or pro bills) to drill down into a screen that allows the user to access request shipment details for goods associated with the shipment.

At Step 1412, the middle-ware application 1000 returns and displays the list of end-delivery shipments (e.g., UPS shipments) that correspond to the shipment (house bill of lading/pro bill) selected by the user. In a preferred embodiment, the end-delivery shipment information is made available to the user at the point that the packages are labeled for end-delivery, which, as indicated above, preferably occurs at either the origin or destination carrier freight stations.

At Step 1414, the user clicks on one of the child shipments. At Step 1416, the middle-ware application 1000 returns and displays a list of the packages associated with the selected shipment. In a preferred embodiment, this information includes some or all of the following: end-delivery tracking number, merchandise description, service type, package weight, freight reference number (e.g., house bill/pro bill number), additional reference fields and consignee shipping information (name, address, city, state, zip, country) and COD amount.

As explained above, such package data displayed in Step 1416 is stored in the PLD extract database 820 as a result of periodic loading from the PLD database 830. FIG. 13 illustrates the loading process as comprising Step 1301 that the backend system server 1020 sends PLD data to the middle-ware application 1000 on an hourly basis, and Step 1302 that the middle-ware application 1000 receives the PLD data into a server database, i.e., the PLD extract database 820. As seen below, the FGV communicates with the backend system by use of XML requests. However, the existing XML interface for retrieving PLD data is limited by the fact that it can only return a maximum of 64 kb amount of data. To overcome this limitation to data retrieval, using hourly data loading would facilitate transferring of data over the amount of 64 kb.

Turning back to FIG. 14, at Step 1418, the user attempts to drill down further into the end-delivery information by clicking on a hypertext link that is associated with the end-delivery tracking number. At Step 1420, the FGV receives this user request and converts the request into an XML request to the backend system server 1020 (end-delivery tracking system) for an updated status of the requested package. At Step 1422, the backend system server 1020 (end-delivery tracking system) receives the XML tracking request and returns the package status information for the requested package. At Step 1424, the middle-ware application 1000 receives the updated status from the end-delivery tracking system and displays the updated status to the user. Finally, at Step 1426, the user views the most recent status of the end-delivery shipping process using the freight tracking system interface.

e. Exemplary Screens

FIGS. 15-20 illustrate the user interface designs in accordance with one embodiment of the present invention. FIG. 15 shows a screen flow that corresponds to the above-described process flow in FIG. 14. This screen flow comprises a track shipments query page 1510, a customize output page 1520, a track shipments result list page 1530, a track shipment details page 1540, a shipment details page 1550 and a package detail (XML) page 1560. Exemplary screen displays corresponding to this screen flow are illustrated in FIGS. 16-20 respectively.

Figure 16:
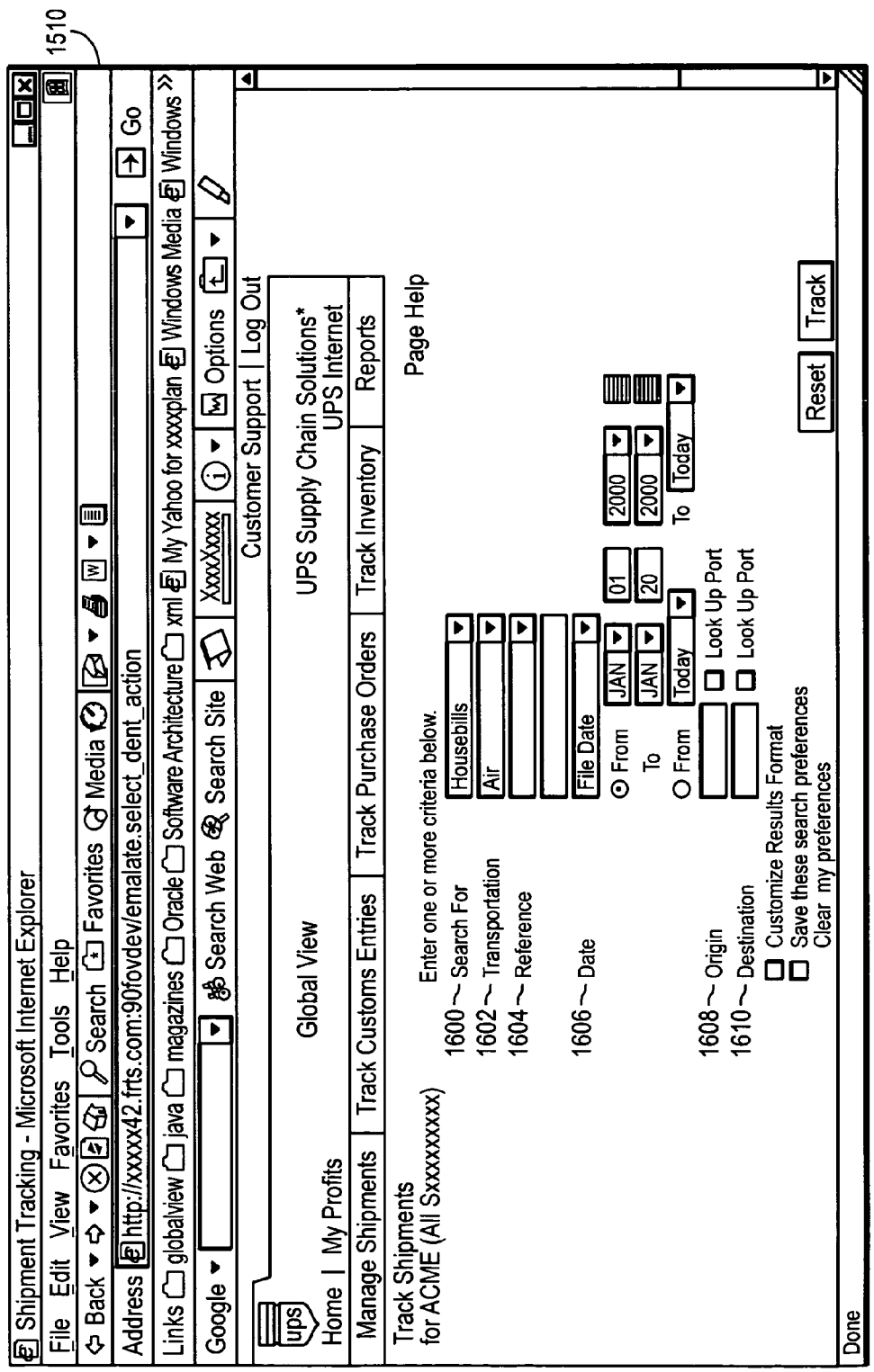

Starting with FIG. 16, after a user logs on the web-based browser interface, the track shipments query page 1510 will be displayed. In this screen display, the user is allowed to enter one or more criteria to query specific shipments. For example, in a drop-down list 1600, a user can select what information to "Search For". The user can choose, for example, to view all House Bills associated with consolidated shipments. Other criteria include a reference field of "Transportation" 1602 in which the user can select to search for air, ocean or ground transportation, a reference field of "Reference" 1604 in which the user can type in a reference number such as House Air Waybills, a reference field of "Date" 1606 by which the user can select a time period or a fixed time point, a reference field of "Origin" 1608 and a reference field of "Destination" 1610.

In response to the user query, the track shipments result list page 1530 as exemplified in FIG. 17 returns and displays a list of searched shipment results. Each shipment is represented by a shipment reference number (102 as aforementioned), i.e., Housebill/Truckbill 1701 in FIG. 17. Each reference number is provided with a hyperlink that allows the user to click on in order to get more shipment details as shown in FIG. 18.

FIG. 18 shows shipment details regarding a consolidated shipment identified by a house bill number (here referred as "ACME-SURF-DEMO1"). The display is comprised of several detail sections. Section 1801 shows general information of a consolidated shipment such as the origin and destination. Section 1802 shows routing information of the consolidated shipment. Section 1803 shows a list of LTL child shipments associated with the consolidated shipment. Each LTL child shipment is identified by a child shipment reference number 114 (Sub-Pro number) which is provided with a hyperlink that allows the user to click on and drill down for more details of a particular LTL child shipment. Section 1804 shows a child shipment comprising a list of small packages associated with the consolidated shipment. Similarly, each package number 112 identifying each package is provided with a hyperlink that allows the user to click on and drill down for more details of a particular package. Section 1805 shows significant tracking events of the movement of the consolidated shipment.

FIG. 19 provides a summary list of multiple small packages contained by a child shipment. Each listed package is identified by a package tracking number that is provided with a hyperlink allowing the user to click on and drill down for more details of a particular package.

Figure 20:
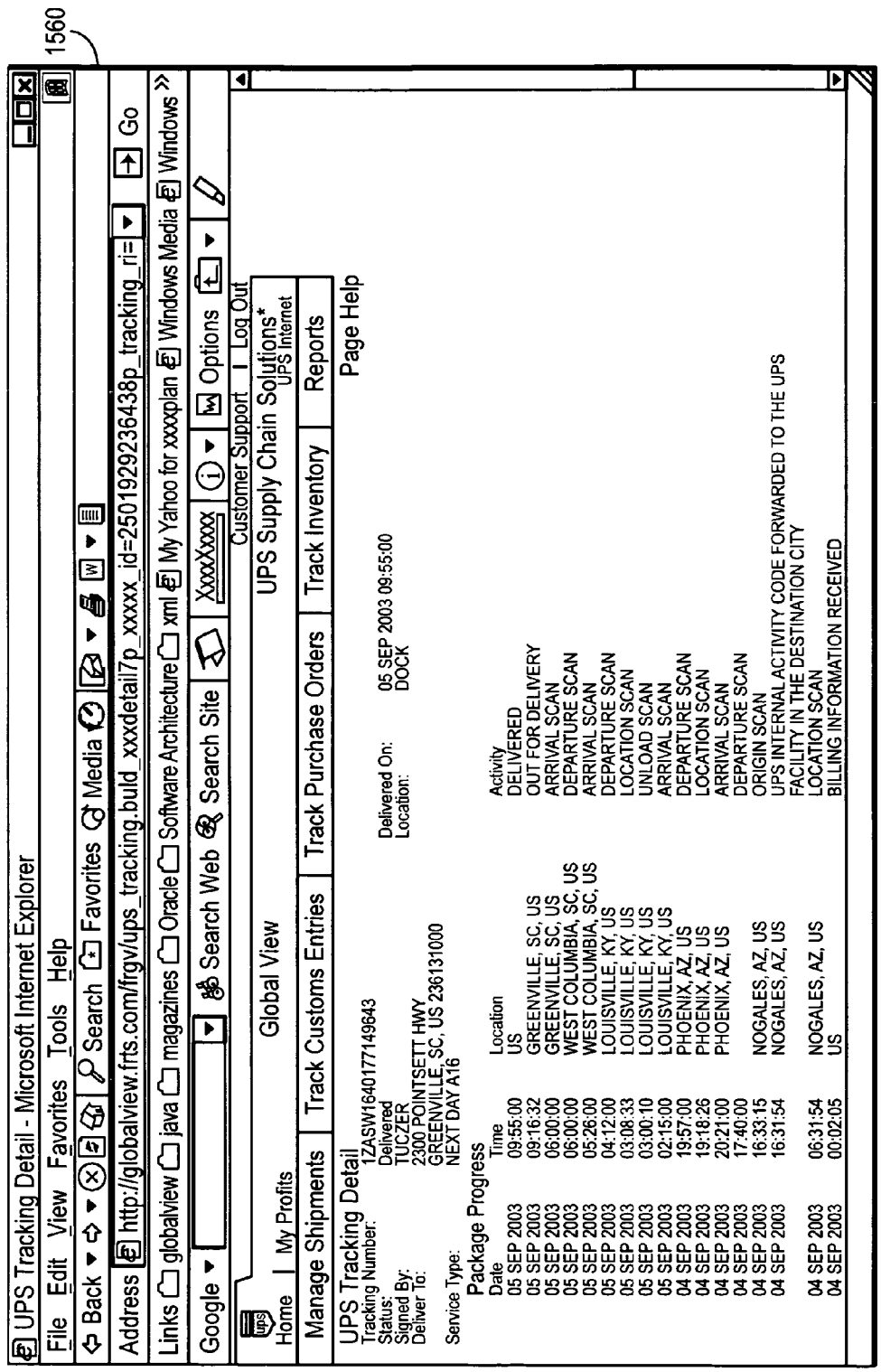

When a user clicks on one particular package tracking number in FIG. 19, the screen display in FIG. 20 will be shown to present detailed moving status of the package identified by that particular package tracking number.

Based on the above-explained system architecture, hardware requirements, data structures, process flow and exemplary screen displays, it will be readily appreciated by a person of ordinary skill that the present invention provides end-to-end visibility for any entity involved in shipment of goods. Specifically, shippers or consignees are able to use an integrated interface to track status of both freight shipments that include their individual child shipments and their own shipment down to the package detail level. Furthermore, by means of well-known user identity verifications, such as verifying user names and user passwords, the present invention allows for different levels of visibility available to different users. For example, a consignee may be allowed to view further details of his child shipments within a consolidated shipment, but not details of other child shipments within the same consolidated shipment.

As described above, the present invention provides end-to-end visibility in the movement of a package. In addition, by consolidating child shipments, the present invention allows for shippers' flexibility in distributing goods in shipment. The combination of end-to-end visibility and the ability to delay a determination of the ultimate destination for goods in transit provides a degree of flexibility in inventory management that is not known in the art. As an example, goods that are moved by ocean vessel often spend two or more weeks traveling in the cargo hold of the vessel. Using the global visibility tracking system described above, an importer can determine the arrival date of the ocean vessel, commodity information, and in a preferred embodiment, information describing the content of the packages in the cargo hold of that vessel. This knowledge allows the ocean vessel to serve as a de facto distribution center in that it provides the importer with an inventory of goods that the importer can direct to any number of different locations. In view of this example, a virtual inventory system can be accomplished in accordance with one embodiment of the present invention.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for virtual inventory management, said method comprising the steps of:
    (1) receiving from a shipper a shipment request for a carrier to ship packages, said shipment request identifying at least a destination country where said packages need to be shipped;
    (2) upon an approval of said shipment request by said carrier, receiving said packages from said shipper at a first operation station of said carrier;
    (3) receiving and processing shipping data associated with said packages in a global shipment system operated by said carrier, said global shipment system comprising one or more processors connected to one or more respective memories, said processors configured to generate data representative of a consolidated shipment, said consolidated shipment comprising said packages from said shipper with one or more shipments to be shipped to said destination country;
    (4) sending a notification to said shipper when said consolidated shipment comprising said packages is received at a second operation station of said carrier in said destination country; and
    (5) upon said notification, receiving from said shipper specific consignee locations in said destination country, said processors configured to separate said consolidated shipment into one or more child shipments, each of said one or more child shipments associated with one of said consignee locations and comprising one or more of said packages so that said each of said one or more child shipments can be dispatched and delivered by said carrier to respective consignee locations.

2. The method of claim 1, comprising a further step of providing an interface for said shipper to track a status of said packages by entering one or more package identifiers.

3. The method of claim 1, wherein said global shipment system is further configured to generate a consolidated shipment reference number for identifying said consolidated shipment and to associate said consolidated shipment reference number with identifiers of said packages.

* * * * *